US007882032B1

(12) United States Patent
Hoffman

(10) Patent No.: US 7,882,032 B1
(45) Date of Patent: Feb. 1, 2011

(54) SYSTEM AND METHOD FOR TOKENLESS BIOMETRIC AUTHORIZATION OF ELECTRONIC COMMUNICATIONS

(75) Inventor: Ned Hoffman, Sebastopol, CA (US)

(73) Assignee: Open Invention Network, LLC, Durham, NC (US)

( * ) Notice: Subject to any disclaimer, the term of this patent is extended or adjusted under 35 U.S.C. 154(b) by 2614 days.

(21) Appl. No.: 09/639,948

(22) Filed: Aug. 17, 2000

Related U.S. Application Data

(63) Continuation-in-part of application No. 09/398,914, filed on Sep. 16, 1999, which is a continuation-in-part of application No. 09/244,784, filed on Feb. 5, 1999, now Pat. No. 6,012,039, which is a continuation-in-part of application No. 08/705,399, filed on Aug. 29, 1996, now Pat. No. 5,870,723, which is a continuation-in-part of application No. 08/442,895, filed on May 17, 1995, now Pat. No. 5,613,012, which is a continuation-in-part of application No. 08/345,523, filed on Nov. 28, 1994, now Pat. No. 5,615,277.

(51) Int. Cl.
*G06F 21/00* (2006.01)

(52) U.S. Cl. .............................. 705/50; 705/64; 705/67; 902/3; 726/17; 726/21

(58) Field of Classification Search .................. 705/50, 705/64; 713/186
See application file for complete search history.

(56) References Cited

U.S. PATENT DOCUMENTS 3,639,905 A    2/1972 Yaida et al.

(Continued)

FOREIGN PATENT DOCUMENTS

EP    0581421 A1    2/1994

(Continued)

OTHER PUBLICATIONS

Rechtin, Mark, Fingerprint Technology Makes for Best ID system, May 1990, Orange County Business Journal, NewPort Beach, vol. 12, iss. 51, Sec. 1, p. 7.*

(Continued)

*Assistant Examiner*—Chrystina Zelaskiewicz
(74) *Attorney, Agent, or Firm*—Gregory A. Stephens

(57) ABSTRACT

This invention is a method and system for tokenless biometric authorization of an electronic communication, using a biometric sample, a master electronic identicator, and a public communications network, wherein the method includes: an electronic communication formation step, wherein at least one communication comprising electronic data is formed; a user registration step, wherein a user electronically submits a registration biometric sample taken directly from the person of the user; a public network data transmittal step, wherein the registration biometric sample is electronically transmitted to a master electronic identicator via a public communications network, said master electronic identicator comprising a computer database which electronically stores all of the registration biometric samples from all of the registered users; a user registration biometric storage step, wherein the registration biometric sample is electronically stored within the master electronic identicator; a bid biometric transmittal step, wherein a bid biometric sample, taken directly from the person of the user, is electronically transmitted to at least one electronic identicator; a user identification step, wherein an electronic identicator compares the bid biometric sample to at least one registration biometric sample previously stored in an electronic identicator, for producing either a successful or failed identification of the user; an electronic communication authorization step, wherein upon a successful identification of the user by an electronic identicator, at least one electronic communication is authorized for execution; wherein an electronic communication is biometrically-authorized without the user having to present any personalized man-made memory tokens such as smartcards, or magnetic stripe cards.

32 Claims, 8 Drawing Sheets

U.S. PATENT DOCUMENTS

| | | | |
|---|---|---|---|
| 3,876,864 A | 4/1975 | Clark et al. | |
| 3,943,335 A | 3/1976 | Kinker et al. | |
| 3,975,711 A | 8/1976 | McMahon | |
| 4,048,618 A | 9/1977 | Hendry | |
| 4,104,718 A | 8/1978 | Poublan et al. | |
| 4,151,512 A | 4/1979 | Riganati et al. | |
| 4,177,510 A | 12/1979 | Appell et al. | |
| 4,208,651 A | 6/1980 | McMahon | |
| 4,213,038 A | 7/1980 | Silverman et al. | |
| 4,227,805 A | 10/1980 | Schiller | |
| 4,253,086 A | 2/1981 | Szwarcbier | |
| 4,321,672 A | 3/1982 | Braun | 364/408 |
| 4,322,163 A | 3/1982 | Schiller | |
| 4,353,056 A | 10/1982 | Tsikos | |
| 4,358,677 A | 11/1982 | Ruell et al. | |
| 4,390,968 A | 6/1983 | Hennessy | 364/900 |
| 4,429,413 A | 1/1984 | Edwards | |
| 4,484,328 A | 11/1984 | Schlafly | 370/394 |
| 4,537,484 A | 8/1985 | Fowler et al. | |
| 4,544,267 A | 10/1985 | Schiller | |
| 4,582,985 A | 4/1986 | Lofberg | |
| 4,618,988 A | 10/1986 | Schiller | |
| 4,649,563 A | 3/1987 | Riskin | |
| 4,675,815 A | 6/1987 | Kuroki | 364/900 |
| 4,696,046 A | 9/1987 | Schiller | |
| 4,699,149 A | 10/1987 | Rice | |
| 4,720,869 A | 1/1988 | Wadia | |
| 4,728,186 A | 3/1988 | Eguchi et al. | |
| 4,734,858 A | 3/1988 | Schlafly | 705/26 |
| 4,747,050 A | 5/1988 | Brachtl et al. | |
| 4,752,966 A | 6/1988 | Schiller | |
| D298,536 S | 11/1988 | Brefka | |
| 4,784,484 A | 11/1988 | Jensen | |
| 4,790,564 A | 12/1988 | Larcher et al. | |
| 4,799,156 A | 1/1989 | Shavit | 364/401 |
| 4,805,223 A | 2/1989 | Denyer | |
| 4,821,118 A | 4/1989 | Lafreniere | 358/108 |
| 4,837,422 A | 6/1989 | Dethloff et al. | 364/408 |
| 4,845,636 A | 7/1989 | Walker | |
| 4,868,376 A | 9/1989 | Lessin et al. | |
| 4,926,480 A | 5/1990 | Chaum | 380/23 |
| 4,946,276 A | 8/1990 | Chilcott | |
| 4,947,028 A | 8/1990 | Gorog | 235/380 |
| 4,947,443 A | 8/1990 | Costello | |
| 4,961,142 A | 10/1990 | Elliott et al. | 364/408 |
| 4,993,068 A | 2/1991 | Piosenka et al. | 380/23 |
| 4,995,086 A | 2/1991 | Lilley et al. | 382/4 |
| 4,998,279 A | 3/1991 | Weiss | 340/825 |
| 5,025,372 A | 6/1991 | Burton | |
| 5,036,461 A | 7/1991 | Elliot et al. | 364/408 |
| 5,054,089 A | 10/1991 | Uchida et al. | 382/4 |
| 5,054,090 A | 10/1991 | Knight et al. | |
| 5,056,019 A | 10/1991 | Schultz et al. | |
| 5,073,950 A | 12/1991 | Colbert et al. | |
| 5,077,803 A | 12/1991 | Kato et al. | |
| 5,088,817 A | 2/1992 | Igaki et al. | |
| 5,095,194 A | 3/1992 | Barbanell | 235/380 |
| 5,103,486 A | 4/1992 | Grippi | |
| 5,105,467 A | 4/1992 | Kim et al. | |
| 5,109,427 A | 4/1992 | Yang | 382/4 |
| 5,109,428 A | 4/1992 | Igaki et al. | 382/5 |
| 5,144,680 A | 9/1992 | Kobayashi | 250/556 |
| 5,145,102 A | 9/1992 | Minato et al. | |
| 5,146,102 A | 9/1992 | Higuchi et al. | 382/4 |
| 5,161,204 A | 11/1992 | Hutcheson et al. | |
| 5,168,520 A | 12/1992 | Weiss | 380/23 |
| 5,180,901 A | 1/1993 | Hiramatsu | 235/380 |
| 5,191,611 A | 3/1993 | Lang | 380/25 |
| 5,210,588 A | 5/1993 | Lee | 356/71 |
| 5,210,797 A | 5/1993 | Usui et al. | 382/4 |
| 5,222,152 A | 6/1993 | Fishbine et al. | 382/2 |
| 5,224,164 A | 6/1993 | Eisner et al. | 380/44 |
| 5,224,173 A * | 6/1993 | Kuhns et al. | 382/116 |
| 5,229,764 A * | 7/1993 | Matchett et al. | 340/5.52 |
| 5,230,025 A | 7/1993 | Fishbine et al. | 382/4 |
| 5,239,583 A | 8/1993 | Parrillo | 380/23 |
| 5,241,606 A | 8/1993 | Horie | 382/4 |
| 5,251,259 A | 10/1993 | Mosley | 380/23 |
| D340,919 S | 11/1993 | Lee | |
| 5,265,162 A | 11/1993 | Bush et al. | 380/24 |
| 5,267,324 A | 11/1993 | Kumagai | |
| 5,274,695 A | 12/1993 | Green | |
| 5,276,314 A | 1/1994 | Martino et al. | 235/380 |
| 5,280,527 A * | 1/1994 | Gullman et al. | 713/184 |
| 5,280,627 A * | 1/1994 | Flaherty et al. | 713/2 |
| 5,321,242 A | 6/1994 | Heath, Jr. | 235/382 |
| 5,321,765 A | 6/1994 | Costello | |
| 5,325,442 A | 6/1994 | Knapp | 382/4 |
| 5,329,589 A | 7/1994 | Fraser et al. | |
| 5,335,288 A | 8/1994 | Faulkner | 381/2 |
| 5,343,529 A | 8/1994 | Goldfine et al. | 380/23 |
| 5,351,303 A | 9/1994 | Willmore | 382/4 |
| 5,354,974 A | 10/1994 | Eisenberg | 235/379 |
| 5,359,669 A | 10/1994 | Shanely et al. | 382/117 |
| 5,371,794 A * | 12/1994 | Diffie et al. | 713/156 |
| 5,371,797 A | 12/1994 | Bocinsly, Jr. | |
| 5,383,113 A | 1/1995 | Kight et al. | 705/40 |
| 5,386,104 A | 1/1995 | Sime | 235/379 |
| 5,400,662 A | 3/1995 | Tamori | |
| 5,412,738 A | 5/1995 | Brunelli et al. | |
| 5,416,573 A | 5/1995 | Sartor, Jr. | |
| 5,429,006 A | 7/1995 | Tamori | |
| 5,457,747 A * | 10/1995 | Drexler et al. | 713/186 |
| 5,465,290 A | 11/1995 | Hampton et al. | |
| 5,465,303 A | 11/1995 | Levison et al. | |
| 5,466,919 A | 11/1995 | Hovakimian | |
| 5,469,506 A | 11/1995 | Berson et al. | |
| 5,484,988 A | 1/1996 | Hills et al. | |
| 5,485,510 A | 1/1996 | Colbert | |
| D367,044 S | 2/1996 | Arakaki | |
| 5,493,621 A | 2/1996 | Matsumura | |
| 5,499,288 A | 3/1996 | Hunt | 379/266 |
| 5,513,272 A | 4/1996 | Bogosian, Jr. | |
| 5,517,558 A | 5/1996 | Schalk | |
| 5,533,123 A | 7/1996 | Force et al. | |
| 5,534,855 A | 7/1996 | Shockley et al. | |
| 5,546,471 A | 8/1996 | Merjanian | |
| 5,546,523 A | 8/1996 | Gatto | |
| 5,561,718 A | 10/1996 | Muller | 379/266 |
| 5,572,597 A | 11/1996 | Chang et al. | |
| 5,577,120 A | 11/1996 | Penzias | |
| 5,578,808 A * | 11/1996 | Taylor | 235/380 |
| 5,592,611 A | 1/1997 | Midgely et al. | |
| 5,594,806 A * | 1/1997 | Colbert | 382/115 |
| 5,598,474 A | 1/1997 | Johnson | |
| 5,602,933 A | 2/1997 | Blackwell et al. | |
| 5,604,802 A | 2/1997 | Holloway | 380/24 |
| 5,613,012 A | 3/1997 | Hoffman et al. | 382/115 |
| 5,615,277 A | 3/1997 | Hoffman | 382/115 |
| 5,621,812 A | 4/1997 | Deaton et al. | |
| 5,635,723 A | 6/1997 | Fujieda et al. | |
| 5,636,038 A | 6/1997 | Lynt et al. | |
| 5,636,282 A | 6/1997 | Holmquist | 380/25 |
| 5,647,364 A | 7/1997 | Schneider et al. | |
| 5,650,217 A | 7/1997 | Skrivanek et al. | |
| 5,655,116 A | 8/1997 | Kirk et al. | |
| 5,677,989 A | 10/1997 | Rabin et al. | |
| 5,719,950 A * | 2/1998 | Osten et al. | 382/115 |
| 5,745,555 A | 4/1998 | Mark | 379/95 |
| 5,748,780 A | 5/1998 | Stolfo | |
| 5,757,917 A | 5/1998 | Rose et al. | |
| 5,764,789 A | 6/1998 | Pare, Jr. et al. | 382/115 |
| 5,768,134 A | 6/1998 | Swaelens et al. | |
| 5,770,849 A | 6/1998 | Novis et al. | |

| | | |
|---|---|---|
| 5,787,187 A | 7/1998 | Bouchard et al. |
| 5,790,668 A | 8/1998 | Tomko ......................... 380/25 |
| 5,794,207 A | 8/1998 | Walker et al. |
| 5,796,857 A | 8/1998 | Hara |
| D397,682 S | 9/1998 | Yotukura |
| 5,802,199 A | 9/1998 | Pare, Jr. et al. .............. 382/115 |
| 5,805,719 A | 9/1998 | Pare, Jr. et al. .............. 382/115 |
| D400,191 S | 10/1998 | Butts et al. |
| 5,822,737 A | 10/1998 | Ogram |
| 5,825,884 A | 10/1998 | Zdepski et al. |
| 5,825,907 A | 10/1998 | Russo |
| 5,825,924 A | 10/1998 | Kobayashi |
| 5,826,241 A | 10/1998 | Stein et al. ..................... 705/26 |
| 5,826,245 A | 10/1998 | Sandberg-Diment ......... 705/44 |
| 5,832,464 A | 11/1998 | Houvener et al. |
| 5,838,812 A | 11/1998 | Pare, Jr. et al. ................. 705/44 |
| 5,844,287 A | 12/1998 | Hassan et al. |
| 5,845,005 A | 12/1998 | Setlak et al. |
| 5,848,400 A | 12/1998 | Chang |
| 5,850,442 A | 12/1998 | Muftic |
| 5,870,723 A | 2/1999 | Pare, Jr. et al. ................. 705/39 |
| 5,876,926 A | 3/1999 | Beecham |
| 5,892,824 A | 4/1999 | Beatson et al. ................ 380/25 |
| 5,892,838 A | 4/1999 | Brady |
| 5,910,988 A | 6/1999 | Ballard |
| 5,926,555 A | 7/1999 | Ort et al. |
| 5,930,804 A | 7/1999 | Yu et al. ..................... 707/104 |
| 5,933,515 A | 8/1999 | Pu et al. |
| 5,935,071 A | 8/1999 | Schneider et al. |
| 5,943,235 A | 8/1999 | Earl et al. |
| 5,943,423 A | 8/1999 | Muftic |
| 5,956,700 A | 9/1999 | Landry ......................... 705/40 |
| 5,982,914 A | 11/1999 | Lee et al. |
| 5,986,746 A | 11/1999 | Metz et al. |
| 5,991,372 A | 11/1999 | Davenport D'Ingianni et al. |
| 6,011,858 A | 1/2000 | Stock et al. |
| 6,012,039 A | 1/2000 | Hoffman et al. |
| 6,016,476 A | 1/2000 | Maes et al. ..................... 705/1 |
| 6,023,688 A | 2/2000 | Ramachandran et al. ...... 705/44 |
| 6,023,783 A | 2/2000 | Divsalar et al. |
| 6,028,950 A | 2/2000 | Merjanian |
| 6,029,195 A | 2/2000 | Herz |
| 6,040,783 A | 3/2000 | Houvener et al. ...... 340/825.31 |
| 6,041,309 A | 3/2000 | Laor |
| 6,045,039 A | 4/2000 | Stinson et al. |
| 6,052,675 A | 4/2000 | Checchio |
| 6,064,751 A | 5/2000 | Smithies et al. |
| 6,070,141 A | 5/2000 | Houvener et al. |
| 6,072,894 A | 6/2000 | Payne |
| 6,073,840 A | 6/2000 | Marion |
| 6,084,967 A | 7/2000 | Kennedy et al. |
| 6,105,010 A | 8/2000 | Musgrave ..................... 705/44 |
| 6,111,977 A | 8/2000 | Scott et al. |
| 6,119,096 A | 9/2000 | Mann et al. |
| 6,154,727 A | 11/2000 | Karp et al. |
| 6,154,879 A | 11/2000 | Pare, Jr. et al. |
| 6,182,076 B1 | 1/2001 | Yu et al. |
| 6,192,142 B1 | 2/2001 | Pare, Jr. et al. |
| 6,202,151 B1 | 3/2001 | Musgrave et al. ........... 713/186 |
| 6,208,746 B1 | 3/2001 | Musgrave |
| 6,219,439 B1 | 4/2001 | Burger |
| 6,219,692 B1 | 4/2001 | Stiles |
| 6,223,209 B1 | 4/2001 | Watson |
| 6,230,148 B1 | 5/2001 | Pare, Jr. et al. |
| 6,233,565 B1 | 5/2001 | Lewis et al. |
| 6,233,618 B1 | 5/2001 | Shannon |
| 6,256,737 B1 | 7/2001 | Bianco et al. |
| 6,260,024 B1 | 7/2001 | Shkedy |
| 6,268,788 B1 | 7/2001 | Gray |
| 6,269,348 B1 | 7/2001 | Pare, Jr. et al. |
| 6,275,944 B1 | 8/2001 | Kao et al. |
| 6,298,373 B1 | 10/2001 | Burns et al. |
| 6,310,966 B1 | 10/2001 | Dulude et al. ................ 382/115 |
| 6,311,272 B1 | 10/2001 | Gressel |
| 6,327,578 B1 | 12/2001 | Linehan |
| 6,366,682 B1 | 4/2002 | Hoffman |
| 6,370,580 B2 | 4/2002 | Kriegsman |
| 6,377,228 B1 | 4/2002 | Jenkin et al. |
| 6,397,198 B1 | 5/2002 | Hoffman et al. |
| 6,411,728 B1 | 6/2002 | Lee et al. |
| 6,424,249 B1 | 7/2002 | Houvener |
| 6,496,107 B1 | 12/2002 | Himmelstein |
| 6,522,772 B1 | 2/2003 | Morrison et al. |
| 7,133,792 B2 | 11/2006 | Murakami et al. |
| 7,152,787 B2 | 12/2006 | Cheng |
| 2001/0000045 A1 | 3/2001 | Yu et al. |
| 2001/0000535 A1 | 4/2001 | Lapsley et al. |
| 2001/0011247 A1 | 8/2001 | O'Flaherty et al. |
| 2001/0033661 A1 | 10/2001 | Prokoski |
| 2001/0034837 A1 | 10/2001 | Kausik et al. |
| 2001/0044775 A1 | 11/2001 | Saito et al. |
| 2003/0061172 A1 | 3/2003 | Robinson |

FOREIGN PATENT DOCUMENTS

| | | |
|---|---|---|
| EP | 0 598 469 A2 | 5/1994 |
| EP | 0651357 A1 | 3/1995 |
| EP | 0823701 A2 | 2/1998 |
| EP | 0 652 540 B1 | 9/2000 |
| JP | S57-212851 | 12/1982 |
| JP | S59-36860 | 2/1984 |
| JP | 61-187838 | 8/1986 |
| JP | S63-003369 | 1/1988 |
| JP | 63-120385 | 5/1988 |
| JP | 63-261492 | 10/1988 |
| JP | 03-189756 | 8/1991 |
| JP | 03-288954 | 12/1991 |
| JP | 04-322382 | 11/1992 |
| JP | 04-324583 | 11/1992 |
| JP | 05-62057 | 3/1993 |
| JP | 05-250524 | 9/1993 |
| JP | 06-149980 | 5/1994 |
| JP | 06-176135 | 6/1994 |
| JP | 11003382 | 1/1999 |
| JP | 11039540 | 2/1999 |
| JP | 11154260 | 6/1999 |
| WO | WO94/10659 B1 | 5/1994 |
| WO | WO/95/13591 | 5/1995 |
| WO | WO98/09227 | 3/1998 |
| WO | WO98/23062 A1 | 5/1998 |
| WO | WO/98/25227 | 6/1998 |
| WO | WO98/50875 | 11/1998 |
| WO | WO99/28847 B1 | 6/1999 |

OTHER PUBLICATIONS

Rechtin, Mark, "Fingerprint Technology Makes for Best ID System," Orange County Business Journal, Newport Beach, May 14, 1990, vol. 12, Issue 51, Sec. 1, p. 7 (ProQuest document ID 6020297).*
"Is it Time for Biometrics?", Banking Automation Bulletin for Europe, London, Sep. 1992, Issue 115, p. 1 (ProQuest document ID 7415352).*
Anderson et al., *Security Management*, American Society for Industrial Security V.37, n11, 17-19 (Nov. 1993).
Radcliff, *When Data Warehouse become Open House*, Software Management, v16 n11, Nov. 26, 1996.
Anonymous, *A Credit Union Points a Finger at Biometrics*, Bank Network News, v 15 n16, Jan. 13, 1997.
Hall, J., *Scanning Lets Fingerprints Do Talking*, Toronto Star, PA6, May 15, 1997.
Scally, R., *CompUSA Tests Fingerprints to Help Secure Transactions*, Discount Store News v36 n10, May 19, 1997.
"Biometric ID Cards", story from Totse.com, Feb. 1996.
"Biometric payment firm Pay By touch secures $10 million funding", story from Finextra.com, Oct. 2003.
"Biometrics Comparison Chart", ncsc.dni.us, 2002.
"Pay By Touch announces first UK Customer", May 2004.

"Recently Granted Patents in the USA—Sep. 1998"; Transponder News; (5 pages).

"Supermarkets and Shopper Registration Guide", from Nocards.org.

"TCP Protocol Overview" downloaded Dec. 26, 2007.

"Why do you call them 'registration and monitoring' programs?", question from CASPIAN, Nocards.org., 2005.

Anonymous; "A Credit Union Points a Finger at Biometrics"; Bank Network News; v. 15, No. 16; Jan. 13, 1997.

Cavoukian, Ann, "Consumer Biometric Applications: A Discussion Paper", Information and Privacy Commissioner, Ontario, Canada. Sep. 1999.

Cavoukian, Ann, Ph. D., "Building in Privacy", May 14-16, 1996. http://www.cpsr.org/cpsr/lists/rre/building_in_privacy. Online 2004.

Holmes et al., "A Performance Evaluation of Biometric Identification Devices", Sandia National Laboratories, Albuquerque, NM, Jun. 1.

Kolor, Joanna; "Biometric Technology Goes Live", Bank Network News; May 1, 1996; 7 pages.

Lange, et al.; "Digital Identification: It's Now at our Fingertips", Electronic Engineering Times; No. 946; Mar. 24, 1997; p. 142.

State of Virginia, Department of Social Services, "What are food stamps?" http://www.dss.virginia.gov/benefit/foodstamp.html, downloaded Nov. 10, 2005.

Stosz, et al. "Automated System for Fingerprint Authentication Using Pores and Ridge Structure", Proceedings of The International Society for Optical Engineering; v. 2277; Jul. 28-29, 1994; pp. 210-223.

Toll, Jaine "Veridicom Showcases New Customers and Applications at COMDEX"; Press Release; Nov. 16, 1998; 3 pages.

Harrow, Jr., "Sale of drivers' photos meant to prevent fraud", Charlotte Herald-Tribune, Jan. 22, 1999 (4 pages).

PR Newswire, "U-Check Employs International Automation Systems, Inc.'s Biometrics to Secure and Monitor Sales of Tobacco Products", Sep. 16, 1999 (2 pages).

Crossen C., "If You Are What you Eat, They've Got Your Number", The Wall Street Journal, Aug. 31, 1989, pp. 1-3.

Perkins, J., "Why Do Supermarkets Want My Social Security Number?", The San Diego Union-Tribune; May 12, 1998, pp. 1-2.

Dean, L., "Card gives cents off without coupons", Star Tribune, Feb. 6, 1991, pp. 1-3.

Washington Post, "Bargains at a Price: Shoppers' Privacy, Cards Let Supermarkets Collect Data", Dec. 31, 1998, pp. 1-3.

* cited by examiner

*Primary Examiner*—Andrew J Fischer

SYSTEM AND METHOD FOR TOKENLESS BIOMETRIC AUTHORIZATION OF ELECTRONIC COMMUNICATIONS

CROSS REFERENCE

This application is a continuation-in-part of U.S. application Ser. No. 09/398,914 filed Sep. 16, 1999, which is a continuation-in-part of U.S. application Ser. No. 09/244,784 filed Feb. 5, 1999, now U.S. Pat. No. 6,012,039, which is a continuation-in-part of U.S. application Ser. No. 08/705,399, filed Aug. 29, 1996, now U.S. Pat. No. 5,870,723, which is a continuation-in-part of U.S. application Ser. No. 08/442,895 filed May 17, 1995, now U.S. Pat. No. 5,613,012, which is a continuation-in-part of U.S. application Ser. No. 08/345,523, filed Nov. 28, 1994, now U.S. Pat. No. 5,615,277.

FIELD OF THE INVENTION

The invention relates generally to computer systems and methods designed to execute electronic communications on behalf of both individual users and enterprise communication centers. More specifically, this invention relates to tokenless biometric computer methods and systems which do not require the individual user to possess any man-made memory devices with resident user-customized information, such as smart cards, magnetic swipe cards or personal computers.

BACKGROUND OF THE INVENTION

Enterprise communication centers are often the primary point of contact through which medium- to large-scale enterprises centrally receive, respond to and initiate various types of electronic communications between themselves and individual users, and between themselves and other enterprises. Enterprise communication centers and their technology have a tremendous impact on the conduct of business in today's economy. Enterprise communication centers are used for selling goods and services, as well as for providing customer care, and are a familiar part of the business life of virtually every person in the United States, and increasingly in the rest of the world. The enterprise communication center industry accounts for a significant segment of the U.S. economy, with a recent industry study estimating that more than 5% of the United States' Gross National Product is transacted through formal enterprise communication centers, such as call-centers and email-centers. Further, an estimated installed base of 6,000,000 people in the United States are call-center or email-center agents, constituting the workforce dedicated to handling enterprise communications.

As the volume of electronic communications significantly increases, so has the complexity of handling this traffic through enterprise communication centers. The users that are serviced by enterprise communication centers are extremely diverse. The service provided by the communication center must be customized to each customer. This is especially important since it is currently estimated that more than 80% of incoming communications to an enterprise are generated by less than 20% of the users who are in contact with that enterprise; therefore those users expect to both receive user-customized attention and experience high satisfaction.

One of the primary factors causing the use of electronic communications to proliferate is the advent of personal computers, or "terminals", combined with improved communications networks such as intranets and the Internet. Such intranets are often proprietary, secure and are, in and of themselves, communicationally isolated from other enterprise intranets; the "Internet", by contrast, is a vast non-proprietary network composed of thousands of interconnected computers, including serving to openly interconnect separate enterprise intranets. The Internet is made up of large backbone networks (such as MILNET, NSFNET, and CREN), and smaller networks that link to them, together using UNIX utilities such as FTP, Archie, Telnet, Gopher and Veronica to ensure reliable access to the Internet.

The growth in popularity of electronic communications has accompanied a marketplace transition from using an off-line, individual desktop personal computing model to using an on-line, central-server communications model. Specifically, corporations and individual consumers are moving the main functions of storage, access, processing and presentation of their electronic communications from decentralized, unconnected desktop terminals, to centralized databases on servers which service and connect to on-line PCs, known as "client terminals", via dial-up, leased lines or wireless networks. Further still, these client terminals are proliferating because cost reductions in miniaturizing computer hardware components have led to the widespread use of a new generation of computing devices, known herein as "thin-clients". These thin-clients are even less expensive and more mobile than traditional desktop terminals and client terminals and include, but are not limited to: wireless pagers; wireless and tethered telephones; network computers; thin-client exercise machines; electronic books; public access kiosks such as automated teller machines, vending machines, airport information terminals and or public kiosks; hand-held personal digital assistants such as Palm Pilots™ and the like; on-line photocopy machines; automobile embedded Internet-connected appliances which download preferred radio stations, seat and temperature adjustments, and the like; thin-client household appliances such as refrigerators, microwaves, and the like; thin-client home entertainment appliances including on-line televisions such as WebTV™, portable digital audio systems such as the Rio™, along with their associated remote controls.

The appeal of these new thin-clients is that they offer the potential for the user to send and receive electronic communications at virtually any time and from virtually anywhere. Many of these lower cost thin-clients access much of their processing and memory capacities on-line from remote servers via private network or public network connections. As a result, billions of new electronic communications are sent and received each year in the United States.

The popularity, complexity and importance of electronic communications has highlighted problems, affecting individual users and enterprise communication centers, which underscore the need for a new computer system and method that can provide convenient, reliable identifications of individual users. A first problem is that, with so many personal computing devices, the user now has user-customized electronic data stored on multiple man-made memory devices, or "tokens", which the user must manage and possess for storage, access, processing and presentation of their electronic communications. Further, if the user wants all of these new computing tokens to possess the same capabilities with respect to the user's personalized information and customized functions, then the user needs to frequently and redundantly enter all such user-customized data into each token. This is a cumbersome burden which most consumers eschew. If, on the other hand, the user does not effect such redundancies, then losing or damaging their primary personal computing token would be a severe blow. In this instance, or even in the instance where the user loses or damages a computing token with a subset of their information, then months, and perhaps years, of important personal and likely confidential electronic communications are irretrievably lost, or revealed to an untrusted third-party.

A second problem is that enterprise communication centers are overwhelmed by the significant increase in electronic communications. In conventional systems, separate application programs have been developed to service respective users' electronic communications by operators manning the enterprise communication center's operator consoles. Information regarding a customer, or user, has traditionally been obtained manually and embedded into the application programs. Such user-customized data is often stored in a variety of software formats, and also in various electronic files or databases. This occurs because there are many points of contact between an individual user and an enterprise: the user can contact the enterprise by sending emails, making phone calls, or meeting with sales personnel in the field. Further, separate user-customized records are often referenced and stored via various data, such as the user's name, social security number, home phone number, account number, mother's maiden name, email account, or billing address. This process leads to the segmentation and the dispersal of the customer-related data. As such, enterprise communication centers provide enterprise personnel with outdated, conflicting or incomplete customer data. This approach is inefficient and time consuming, and therefore costly. As an example, current industry statistics indicate that for a medium-sized enterprise communication center handling 250,000 messages per year, an increase of just 5 seconds in responding to each message amounts to a cost increase of over $760,000 annually. The enterprise communication center industry has estimated that cost savings of between 30% and 40% can come from automating a higher percentage of communication responses and reducing message volumes to customer representatives by providing more accurate and more customized handling of enterprise communications.

In sum, the increased volume and complexities of electronic communications, prompted in large part by the popularity of personal computing tokens which handle them, has exacerbated dual problems of: user-reliance on particularly vulnerable, customized memory tokens which can be easily damaged, lost or stolen, and; enterprise communication center overloads due handling vast numbers of electronic communications coming from the personal computing tokens. These problems simultaneously underscore the need for a new computer system and method which conveniently and reliably identifies individual users of electronic communications so that: users are relieved of the need to rely on possession of personal computing tokens to conduct their electronic communications, and; enterprise communications handling these electronic communications are able to run more efficiently.

To address the problem of protecting personal computing tokens and the resident electronic communications they contain, the use of various biometrics, such as fingerprints, hand prints, voice prints, retinal images, handwriting samples and the like have been suggested for identification of individuals. However, because the biometrics are generally themselves stored in electronic, and thus reproducible, form on the token itself and because the comparison and verification process is not isolated from the hardware and software directly used by the user attempting access, the problems of fraudulent access and of having to constantly carry these tokens is not alleviated. Further, such systems do not adequately isolate the identity verification process from tampering by someone attempting to gain unauthorized access.

Examples of this token-based biometric approach to system security are described in U.S. Pat. Nos. 4,821,118 to Lafreniere; 4,993,068 to Piosenka et al.; 4,995,086 to Lilley et al.; 5,054,089 to Uchida et al.; 5,095,194 to Barbanell; 5,109,427 to Yang; 5,109,428 to Igaki et al.; 5,144,680 to Kobayashi et al.; 5,146,102 to Higuchi et al.; 5,180,901 to Hiramatsu; 5,210,588 to Lee; 5,210,797 to Usui et al.; 5,222,152 to Fishbine et al.; 5,230,025 to Fishbine et al.; 5,241,606 to Horie; 5,265,162 to Bush et al.; 5,321,242 to Heath, Jr.; 5,325,442 to Knapp; 5,351,303 to Willmore, all of which are incorporated herein by reference.

An example of a token-based security system which relies on a biometric of a user can be found in U.S. Pat. No. 5,280,527 to Gullman et al. In Gullman's system, the user must carry and present a credit card sized token (referred to as a biometrics security apparatus) containing a microchip in which is recorded characteristics of the authorized user's voice. In order to initiate the access procedure, the user must insert the token into a terminal such as a public kiosk, and then speak into the terminal to provide a biometrics input for comparison with an authenticated input stored in the microchip of the presented token. The process of identity verification is generally not isolated from potential tampering by one attempting unauthorized access. If a match is found, the remote terminal then signals the host computer that access should be permitted, or prompts the user for an additional code, such as a PIN (also stored on the token), before sending the necessary verification signal to the host computer.

Although Gullman's reliance of comparison of stored and input biometrics potentially reduces the risk of unauthorized access as compared to numeric codes, like personal identification numbers, Gullman's use of the token as the repository for the authenticating data combined with Gullman's failure to isolate the identity verification process from the possibility of tampering greatly diminishes any improvement to fraud resistance resulting from the replacement of a numeric code with a biometrics. Further, the system remains cumbersome and inconvenient to use because it too requires the presentation of a personalized memory token in order to initiate an access request.

To address the problem of enterprise communication centers being overwhelmed by the increase in electronic communications, non-biometric, token-based identification systems have been suggested to encourage more reliable identification of users. One such approach has been to employ a "Caller ID" technology, which uses the originating hardware from which a call is initiated to "identify" the caller. This technique can apply to phone calls, whereby the originating phone number is detected, or it can apply to emails and Internet telephony, from which the originating Internet Protocol ("IP") address is detected. However, one critical deficit of this attempted solution is that Caller ID does not, in fact, identify the caller at all. Rather, the technology identifies the "token", or man-made memory device, which an individual uses to initiate the electronic communication. Examples of such tokens include the telephone line or the Internet network address which the user is using. As such, if the individual uses another token, the Caller ID will identify that token differently from the one the individual previously used, even though in actuality the caller is the same person in both cases. This can result in significant confusion and inefficiencies in the handling of electronic communications by enterprise communication centers. This adversely impacts an enterprise's customer-acquisition and customer-retention, which in turn can a significantly negative effect on enterprise revenue and profitability.

Almost uniformly, prior art disclose biometrics are token-based systems and teach away from biometrics recognition without user-dependence on personalized memory tokens. Reasons cited for such teachings range from storage requirements for biometrics recognition systems to significant time lapses in identification of a large number of individuals, even for the most powerful computers.

In view of the foregoing, there has long been a need for a computerized electronic communications system which simultaneously: accommodates the user's need to universally access, process and present their electronic communications with optimal convenience by not requiring the user to possess any man-made memory tokens with resident user-customized data, in order for the user to execute electronic communications, and; increases the accuracy, speed and cost-effectiveness of the handling of these electronic communications by enterprise communication centers.

Further, there is a need for a tokenless computer system which is highly fraud-resistant, and which is centered around the individual themselves by relying solely upon their unique biometric samples. Such a system should be able to function for the user wherever and whenever the user is using any generic on-line computing device, whether a desktop or a thin client, for conducting their electronic communications.

Further, there is a need for a computing system that provides both the user and the enterprise with centralized storage, access, processing and presentation of their electronic communications regardless of whether the personal computing device the user is using possesses only a resident subset of their user-customized data or in fact possesses none of their user-customized data at all. Further, there is a need for a computerized electronic communications system that provides the user with the above benefits whether or not the personal computing device the user is using at any given time contains powerful resident memory and processing capacities, or whether it contains virtually no resident memory and processing capacities. Further, there is a need for a computer system which relieves the user from having to redundantly data-enter and update a variety of individual personal computing devices in order to achieve the same customized performance from any or all of such devices.

There is also a need for a computerized electronic communications system which relieves the user and the enterprise communication center from having to redundantly data-enter their personal demographics and customized electronic communications usage patterns into a variety of databases in order to achieve uniformly customized service. Additionally, there is a need for a computerized electronic communications system which enables a user to benefit from executing customized and complex commands governing their electronic communications regardless of whether the on-line computing device the user happens to be using is a high-powered desktop terminal or whether it is a hand-held, ultra thin-client terminal with virtually no resident computer processing or memory capabilities of its own.

There is further a need for a computerized electronic communications system which centrally stores user-customized data regardless of the many points of contact between an individual user and an enterprise: whether the user contacts the enterprise by sending emails, making phone calls, or meeting with sales personnel in the field. There is also a need for a system that enables enterprise communication centers to: provide enterprise personnel with current, complete and accurate user-customized data; automate a higher percentage of communication responses; reduce message volumes to customer representatives.

There is also a need for an electronic communications system that uses a strong link to the person being identified, as opposed to merely verifying a user's possession of any physical objects that can be freely transferred.

There is a further need for an electronic communications system that ensures user convenience by enabling user-authorization without requiring the user to possess, carry, and present one or more proprietary memory tokens, such as man-made user-customized portable memory devices, in order to effect electronic communications. Anyone who has lost a smart card or a traditional notebook personal computer, left it at home, had it damaged or stolen knows well the keenly and immediately-felt inconvenience caused by such problems. Therefore, there is a need for an electronic biometric communications system that is entirely tokenless.

There is another need in the industry for a computerized electronic communications system that is sufficiently versatile to accommodate both users who desire to use personal identification codes (PICs), being alphabetical, numerical or graphical, for added security and also consumers who prefer not to use them.

Lastly, such a system must be affordable and flexible enough to be operatively compatible with existing networks having a variety of electronic communication devices and system configurations.

SUMMARY OF THE INVENTION

The present invention satisfies these needs by providing a significantly improved system and method for tokenless accessing, processing and presentation of electronic communications requiring only a user's biometric. The method of the invention includes a tokenless biometric authorization of an electronic communication, using a biometric sample, a master electronic identicator, and a public communications network, wherein said method comprises: an electronic communication formation step, wherein at least one communication comprising electronic data is formed; a user registration step, wherein a user electronically submits a registration biometric sample taken directly from the person of the user; a public network data transmittal step, wherein the registration biometric sample is electronically transmitted to a master electronic identicator via a public communications network, said master electronic identicator comprising a computer database which electronically stores all of the registration biometric samples from all of the registered users; a user registration biometric storage step, wherein the registration biometric sample is electronically stored within the master electronic identicator; a bid biometric transmittal step, wherein a bid biometric sample, taken directly from the person of the user, is electronically transmitted to at least one electronic identicator; a user identification step, wherein an electronic identicator compares the bid biometric sample to at least one registration biometric sample previously stored in an electronic identicator, for producing either a successful or failed identification of the user; an electronic communication authorization step, wherein upon a successful identification of the user by an electronic identicator, at least one electronic communication is authorized for execution; wherein an electronic communication is biometrically-authorized without the user having to present any personalized man-made memory tokens such as smartcards, or magnetic stripe cards.

The method of the invention optionally includes a bid biometric transmittal step, wherein the electronic identicator comprises any of the following: a master electronic identicator, and; a subset electronic identicator, said subset electronic identicator comprising a computer database which electronically stores a subset of all of the registration biometric samples from registered users.

Further, any of the steps of said method optionally occur in any of the following chronological sequences: simultaneously, and; separated by any increment of time including seconds, minutes, hours, days, weeks, months, and years.

The method of the invention optionally includes: a first comparison step, wherein a subset electronic identicator compares the bid biometric sample taken directly from the person of the user with at least one registration biometric sample previously stored in the subset electronic identicator for producing either a successful or failed identification of the user; a public network data transmittal step, wherein if the subset electronic identicator returns a failed identification result, the bid biometric sample is electronically transmitted via a public communications network to a master electronic identicator; a second comparison step, wherein a master electronic identicator compares the bid biometric sample to at least one registration biometric sample previously stored in the master electronic identicator for producing either a successful or failed identification of the user; a communication authorization step, wherein upon the earliest successful identification of the user by an electronic identicator, at least one electronic communication is authorized for execution; wherein an electronic communication is biometrically-authorized without the user having to present any personalized man-made memory tokens such as smartcards, or magnetic swipe cards.

Further, the method of the invention optionally includes: an enterprise registration step, wherein an enterprise electronically submits registration identity data; a public network data transmittal step, wherein the enterprise registration identity data is electronically transmitted to a master electronic identicator via a public communications network; an enterprise registration identity data storage step, wherein the enterprise registration identity data is electronically stored within the master electronic identicator; an enterprise bid identity data network transmittal step, wherein enterprise bid identity data is electronically transmitted to at least one electronic identicator, said electronic identicator comprising any of the following: a subset electronic identicator and a master electronic identicator; an enterprise identification step, wherein an electronic identicator compares the enterprise bid identity data with enterprise registration identity data previously stored in the electronic identicator, for producing either a successful or failed identification of the enterprise; an electronic communication authorization step, wherein upon a successful identification of the enterprise by an electronic identicator and a successful identification of the user by an electronic identicator, at least one electronic communication is authorized for execution; wherein an electronic communication is biometrically-authorized without the user having to present any personalized man-made memory tokens such as smartcards, or magnetic swipe cards.

Further, the method of the invention optionally includes: a first comparison step, wherein a subset electronic identicator compares the enterprise bid identity data with enterprise registration identity data previously stored in the subset electronic identicator for producing either a successful or failed identification of the enterprise; a public network data transmittal step, wherein if the subset electronic identicator returns a failed identification result, the enterprise bid identity data is electronically transmitted via a public communications network to a master electronic identicator; a second comparison step, wherein a master electronic identicator compares the enterprise bid identity data with enterprise registration identity data previously stored in the master electronic identicator for producing either a successful or failed identification of the enterprise; a communication authorization step, wherein upon the earliest successful identification of the user by an electronic identicator and the earliest successful identification of the enterprise by an electronic identicator, at least one electronic communication is authorized for execution; wherein an electronic communication is biometrically-authorized without the user having to present any personalized man-made memory tokens such as smartcards, or magnetic swipe cards.

The method of the invention accommodates any unique biometric sample taken directly from the person of the user, including any of the following: a fingerprint, a facial scan, a retinal image, an iris scan, and a voice print, and; the enterprise is any legally formed entity comprising any of the following: a corporation, a foundation, a non-profit organization, a sole proprietorship, a limited liability company, and a partnership.

Further, the method of the invention optionally includes, during the user identification step, the user providing a personal identification code to the electronic identicator along with a bid biometric sample for purposes of identifying the user. The method optionally includes a user re-registration check step, wherein the user's registration biometric sample is compared by at least one electronic identicator to previously registered biometric samples wherein if a match occurs, the electronic identicator is alerted to the fact that the user has attempted to re-register. The method optionally includes a biometric theft resolution step, wherein a user's personal identification code is changed when the user's registered biometric sample is determined to have been fraudulently duplicated.

The method of the invention optionally includes any enterprise registration identity data that is unique, including any of the following: an alpha-numeric code, a hardware identification code, an email address, a financial account, a biometric of an authorized enterprise representative, a non-financial data repository account, a telephone number, a mailing address, a digital certificate, a network credential, an Internet protocol address, a digital signature, an encryption key, and an instant messaging address. The method optionally includes a third-party communications step, wherein the electronic identicator electronically communicates with a third-party server in order to authorize the electronic communication.

The method optionally includes: a rule-module formation step, wherein a rule-module is formed in an electronic clearinghouse, said rule-module further comprising at least one user-customized pattern data which is associated with at least one execution command; a rule-module invocation step, wherein upon a successful identification of the user, at least one previously designated user-customized rule-module is invoked; an electronic communication execution step, wherein upon the invocation of a user-customized rule-module, at least one electronic communication is executed.

The method optionally includes any user-customized pattern data, including any of the following: a user unique identification code: demographic information; an email address; a financial account; a biometric; Internet browsing patterns; a non-financial data repository account; a telephone number; a mailing address; purchasing patterns; database authorization fields; financial credit report data; a call-center queuing, routing and automated response program; an email-center queuing, routing and automated response program; data on pre-paid accounts or memberships for products or services; electronic data utilization patterns; employee status; job title; data on user behavior patterns; a digital certificate; a network credential; an Internet protocol address; a digital signature; an encryption key; an instant messaging address; user-customized medical records; an electronic audio signature; and an electronic visual signature.

The method optionally includes any execution commands, including any user-customized instructions for executing any of the following: accessing of stored electronic data, processing of electronic data, and presentation of electronic data. User-customized accessing of stored electronic data comprises execution of any of the following: activating of an Internet-connected device; accessing of a secured physical space, and unlocking of a secured physical device. User-customized processing of electronic data comprises invoking any of the following: a digital certificate, an identity scrambler, a database authorization field, an electronic consumer loyalty or consumer rewards incentive, an electronic advertisement, an instant messaging program, real-time tracking of an incoming caller or an email sender, a time and attendance monitoring program, an emergency home alarm and personal safety notification program, a real-time challenge-response program, a call-center queuing prioritization program, a call-center routing prioritization program, an email-center queuing prioritization program, an email-center routing prioritization program, an automated caller or emailer response program, a call-forwarding program, and an electronic intelligent software program for electronic data search and retrieval. User-customized presentation of electronic data comprises any of the following: a print-out, a computer screen display, an audio message, a tactile sensation and a holographic image.

The method optionally includes a third-party communications step, wherein the electronic rule-module clearinghouse communicates with one or more third-party computers in order to invoke a rule-module. The method optionally includes user-customized pattern data being provided to the electronic rule-module clearinghouse by any of the following: the user, the electronic identicator, the electronic rule-module clearinghouse, and a user-authorized third party. The method optionally includes execution commands being provided to the electronic rule-module clearinghouse by any of the following: the user, the electronic rule-module clearinghouse, the electronic identicator and a user-authorized third party.

The method optionally includes: a master rule-module storage step, wherein all of the rule-modules from all of the registered users are stored in a master rule-module clearinghouse; a subset rule-module storage step, wherein a subset of all of the rule-modules from registered users is stored in a subset rule-module clearinghouse; a rule-module invocation step, wherein upon a successful identification of the user, at least one user-customized rule-module is invoked by any of the following: a subset rule-module clearinghouse and a master rule-module clearinghouse; an electronic communication execution step, wherein upon the invocation of a user-customized rule-module, at least one electronic communication is executed.

The method optionally includes: a first rule-module invocation step, wherein the subset rule-module clearinghouse attempts to invoke at least one user-customized rule-module; a public network data transmittal step, wherein if the subset rule-module clearinghouse fails to invoke a user-customized rule-module, the request is transmitted to a master rule-module clearinghouse via a public communications network; a second rule-module invocation step, wherein a master rule-module clearinghouse attempts to invoke at least one user-customized rule-module; an electronic communication execution step, wherein upon the earliest invocation of a user-customized rule-module, at least one electronic communication is executed.

The method optionally includes a master rule-module clearinghouse, comprising: a computer database which electronically stores all of the rule-modules for all of the registered users, and; the subset rule-module clearinghouse comprises a computer database which electronically stores a subset of all of the rule-modules for registered users.

The present invention includes a device comprising a system for tokenless biometric authorization of an electronic communication, using an electronic communication input apparatus, a biometric input apparatus, and a master electronic identicator, wherein said system comprises: a) a communication input apparatus, further comprising a data entry device for formation of an electronic communication; b) a biometric input apparatus, further comprising a device for electronically scanning a biometric sample directly from the person of a user; c) at least one master electronic identicator, further comprising, (i) a computer database containing all of the electronically stored biometric samples from all of the registered users and, (ii) a comparator that electronically compares received a biometric sample with previously stored biometric samples to deliver either a successful or failed identification of the user; d) a data transmittal public network further comprising a public communications network that electronically transmits data between the biometric input apparatus and a master electronic identicator; e) an electronic communication authorization platform that authorizes execution of at least one electronic communication upon a successful identification of the user by an electronic identicator; wherein an electronic communication is biometrically-authorized without the user having to present any personalized man-made memory tokens such as smartcards, or magnetic stripe cards.

The device of the invention preferably includes a master electronic identicator, further comprising a computer database which: has a location which is physically remote from the site at which the user submits a biometric sample directly from his person, and; requires the use of a public communication network that enables receipt of an electronically transmitted registration biometric sample. The device optionally includes a subset electronic identicator having: a computer database containing a subset of all stored biometric samples from registered users in the computer system, and; a comparator that compares a received biometric sample with previously stored biometric samples to deliver either a successful or failed identification of the user.

The device of said system is optionally used in any of the following chronological sequences: simultaneously, and; separated by any increment of time including seconds, minutes, hours, days, weeks, months, and years.

The device optionally includes: a first comparator, comprising a subset electronic identicator comparator that compares the bid biometric sample taken directly from the person of the user with at least one registration biometric sample previously stored in the subset electronic identicator for producing either a successful or failed identification of the user; a data transmittal public network comprising a public communications network that electronically transmits data between the subset electronic identicator and a master electronic identicator; a second comparator, comprising a master electronic identicator comparator which, if the subset electronic identicator fails to successfully identify the user, compares the bid biometric sample to at least one registration biometric sample previously stored in the master electronic identicator for producing either a successful or failed identification of the user; a communication authorization platform, that authorizes execution of an electronic communication upon the earliest successful identification of the user by an electronic identicator; wherein an electronic communication is biometrically-authorized without the user having to present any personalized man-made memory tokens such as smartcards, or magnetic swipe cards.

The device optionally includes: an enterprise data input apparatus for an enterprise to electronically input registration identity data; a data transmittal public network, further comprising a public communications network that electronically transmits data between the enterprise data input apparatus and a master electronic identicator; an electronic communication authorization platform, that authorizes execution of an electronic communication upon a successful identification of the enterprise by an electronic identicator and a successful identification of the user by an electronic identicator; wherein an electronic communication is biometrically-authorized without the user having to present any personalized man-made memory tokens such as smartcards, or magnetic swipe cards.

The device optionally includes: a first comparator, comprising a subset electronic identicator comparator that compares the enterprise bid identity data with enterprise registration identity data previously stored in the subset electronic identicator for producing either a successful or failed identification of the enterprise; a data transmittal public network, further comprising a public communications network that electronically transmits data between the subset electronic identicator and a master electronic identicator; a second comparator, comprising a master electronic identicator comparator which, if the subset electronic identicator fails to successfully identify the enterprise, compares the enterprise bid identity data with enterprise registration identity data previously stored in the master electronic identicator for producing either a successful or failed identification of the enterprise; a communication authorization platform, that authorizes execution of an electronic upon the earliest successful identification of the user by an electronic identicator and the earliest identification of the enterprise by an electronic identicator; wherein an electronic communication is biometrically-authorized without the user having to present any personalized man-made memory tokens such as smartcards, or magnetic swipe cards.

The device is optionally capable of electronically sampling any of the following biometric samples taken directly from the person of the user: a fingerprint, a facial scan, a retinal image, an iris scan, and a voice print. The device is optionally capable of using a personal identification code provided by the user to the electronic identicator along with a bid biometric sample for purposes of identifying the user. The device is optionally capable of a user re-registration, wherein the user's registration biometric sample is compared by at least one electronic identicator to previously registered biometric samples wherein if a match occurs, the electronic identicator is alerted to the fact that the user has attempted to re-register.

The device optionally includes a biometric theft resolution platform, wherein a user's personal identification code is changed when the user's registered biometric sample is determined to have been fraudulently duplicated. The device is capable of handling an electronic communication optionally comprising any of the following: an email, a telephone call, an encrypted data packet, an Internet telephony, and a facsimile. In the device, the data transmittal public network optionally comprises any of the following: an extranet, a wide area network, a cable network, a wireless network, a telephone network, the Internet, an ATM network, or an X.25.

The device optionally includes enterprise registration identity data comprising any of the following: an alpha-numeric code, a hardware identification code, an email address, a financial account, a biometric of an authorized enterprise representative, a non-financial data repository account, a telephone number, a mailing address, a digital certificate, a network credential, an Internet protocol address, a digital signature, an encryption key, and an instant messaging address. The device optionally includes a third-party server interconnecting network, wherein the electronic communication execution platform interconnects with one or more third-party servers in order to execute the electronic communication.

The device optionally includes: a rule-module clearinghouse, further comprising at least one user-customized pattern data which is associated with at least one execution command; a rule-module invocation platform, that invokes at least one previously designated user-customized rule-module upon successful identification of the user; an electronic communication execution platform, that executes at least one electronic communication upon the invocation of a user-customized rule-module.

The device optionally includes pattern data comprising any of the following: a user unique identification code: demographic information; an email address; a financial account; a biometric; Internet browsing patterns; a non-financial data repository account; a telephone number; a mailing address; purchasing patterns; database authorization fields; financial credit report data; a call-center queuing, routing and automated response program; an email-center queuing, routing and automated response program; data on pre-paid accounts or memberships for products or services; electronic data utilization patterns; employee status; job title; data on user behavior patterns; a digital certificate; a network credential; an Internet protocol address; a digital signature; an encryption key; an instant messaging address; user-customized medical records; an electronic audio signature; and an electronic visual signature.

The device optionally includes execution commands comprising user-customized instructions for execution of any of the following: accessing of stored electronic data, processing of electronic data, and presentation of electronic data. The device optionally includes user-customized accessing of stored electronic data further comprises execution of any of the following: activation of an Internet-connected device; accessing of a secured physical space, and unlocking of a secured physical device. The device optionally includes user-customized processing of electronic data further comprises invoking any of the following: a digital certificate, an identity scrambler, a database authorization field, an electronic consumer loyalty or consumer rewards incentive, an electronic advertisement, an instant messaging program, a time and attendance monitoring program, an emergency home alarm and personal safety notification program, a real-time tracking of an incoming caller or an email sender, a real-time challenge-response program, a call-center queuing prioritization program, a call-center routing prioritization program, an email-center queuing prioritization program, an email-center routing prioritization program, an automated caller or emailer response program, a call-forwarding program, and an electronic intelligent software program for electronic data search and retrieval. The device optionally includes user-customized presentation of electronic data comprises any of the following: a print-out, a computer screen display, an audio message, a tactile sensation and a holographic image.

The device optionally includes the rule-module invocation platform being interconnected with one or more third-party computers. The device optionally includes user-customized pattern data provided to the electronic rule-module clearinghouse by any of the following: the user, the electronic identicator, the electronic rule-module clearinghouse, and a user-authorized third party. The device optionally uses execution commands provided to the electronic rule-module clearinghouse by any of the following: the user, the electronic rule-module clearinghouse, the electronic identicator and a user-authorized third party.

The device optionally includes: a master rule-module clearinghouse, comprising a computer database storing all of the rule-modules for all of the registered users; a subset rule-module clearinghouse, comprising computer database storing a subset of all of the rule-modules for registered users; a rule-module invocation platform, that invokes at least one user-customized rule-module upon identification of the user, said platform comprising any of the following: a subset rule-module clearinghouse and a master rule-module clearinghouse; an electronic communication execution platform, that executes at least one electronic communication upon the invocation of a user-customized rule-module.

The device includes a data transmittal public network further comprising: a cable network, a wireless cellular network, a wireless digital network, a telephone network, a wide area network, the Internet, an ATM network, and an X.25 connection. The device also includes a master electronic identicator further comprising a computer database having a location which is physically remote from the site at which the user submitted the registration biometric sample. The device optionally includes a subset electronic identicator further comprising a computer database: being physically remote from the master identicator, and; capable of using any communications network for receiving the bid biometric sample.

The device optionally includes: a first rule-module invocation platform, comprising a subset rule-module clearinghouse that invokes at least one user-customized rule-module; a data transmittal public network, wherein if the subset rule-module clearinghouse fails to invoke a user-customized rule-module, the request is transmitted via a public communications network to a master rule-module clearinghouse; a second rule-module invocation platform, comprising a master rule-module clearinghouse that invokes at least one user-customized rule-module; an electronic communication execution platform, that executes at least one electronic communication upon the earliest invocation of a user-customized rule-module by a rule-module clearinghouse.

It is therefore an objective of this invention to enable users and enterprise communication centers to integrate all electronic communication data via a uniform system for biometrically identifying users without the need for the user's possession of any portable man-made memory devices. It is a further objective to provide uniquely accurate, convenient, and customized handling of electronic communications between individual users and enterprises. Using tokenless biometric technologies, this invention is designed for the benefit of individual users and enterprise communication centers, to uniquely customize and speed the handling of electronic communications, including: queuing, routing/distribution, prioritization, database access, data processing, data presentation, and automated response. This invention is further designed: to improve information management and workflow efficiency; to enable enterprises to better develop and sell their products and services according to specific customer needs, and; to have a positive impact on the effectiveness and profitability of the enterprise.

It is also an objective of the invention to improve the convenience of electronic communications by providing a computerized electronic communications system and method that eliminates the need for a user to directly possess any man-made memory token which is encoded or programmed with data personal to or customized for a single authorized user, such as a smart card, magnetic swipe card or even a personal computer with resident user-customized data. Further, it is an objective of the invention to employ a user's biometric sample for ensuring that only authorized users can access and conduct their own electronic communications. It is another object of the invention to provide tokenless technology for ensuring that users have the portability and mobility to gain immediate access to their electronic communications via any network-connected interface, regardless of the resident capabilities of the computing device the user is using to interface with the computer network and a central server.

It is another object of this invention that any client terminal, such as a public computing kiosk without resident user-customized data and without extensive resident software, be automatically and nearly instantly transformed, via a user's biometric log-on using this invention, into a terminal receiving on-line sophisticated computing capabilities that are customized for the user, complete with user-customized electronic communication accessing, processing and presentation. It is further an object of this invention that the user be able to receive customized presentation of: their Internet web portal displaying all URLs with which the user has pre-registered for access privileges; personalized recommendations for local activities, events and people that reflect their priorities; their Internet web site preferences, or "bookmarks"; and their Internet "cookies", or that set of data that an Internet website server provides to a user each time the user visits the website. It is further an object of this invention, that a central database save the information the cookies contains about the user, as a text file stored in the Netscape or Explorer system folder, and that this data can be temporarily downloaded this data to whatever client terminal the user is currently logged onto.

It is another object of this invention to provide a computerized electronic communications system centered around the identification of the user rather than any devices he possesses. In particular, this invention provides an electronic communication system that is universally accessible to the user because he only needs his biometric to log onto a network, rather than having to rely on his having to possess any man-made memory tokens. In a traditional "unit-centric" communications model, the unit is any personalized memory token on which is stored user-customized electronic data, or information, that is: a) customized and perhaps even unique to a single user, and; b) required to execute an electronic communication based on electronic data customized to a particular user's specifications or preferences. As such, the use or presentation of that memory token is a requirement for the user to conduct electronic communications which contains content customized, if not unique, to the user's criteria.

In this invention, emphasizing a "biometric-centric" communications model, there is no need for any memory token to be required by the user to execute an electronic communication. This invention employs a user's biometric identification to enable a user to experience consistently accurate and time-efficient contact with enterprise communications centers that centrally store, access, process and present any customized electronic communication independent of which computing device the user is using, whether it be a generic public kiosk with no resident information personalized to the user, or a hand held thin client with a minimal subset of data personalized to the user. In this invention, the computing and memory capabilities resident within the user's personal computing device are nearly irrelevant, so long as the device can connect to an on-line network, such as the Internet, and provides the user with basic biometric input, data input and data display apparatus.

Yet another object of this invention is to construct and present for the user, on any biometric input apparatus the user is using, a user-customized gateway to the Internet containing their desired bookmarks, their personalized search engine and their customized web page directory. This is the user's personal Internet web page "portal" which is a starting point for their electronic communications, including electronic mail, Internet web browsing or "surfing", and the like.

A further object of this invention is that in all of these electronic communications, this invention provides the user the ability, with only a biometric log-on, to automatically enter all restricted or confidential third-party, or enterprise, databases to which the user has pre-authorized access privileges throughout communications networks.

It is another object of this invention that, once the user has completed their on-line usage of the client terminal for a particular on-line session, all of the data stream from their on-line session, including all new cookies provided by third-parties on behalf of the user and all new data on their browsing activity, be batched and forwarded to central database for downloading and storage.

It is another object of the invention to provide a computer system that is capable of verifying a user's identity, as opposed to verifying possession of propriety objects and information. It is yet another object of the invention to verify user identity based on one or more unique biometric characteristics physically personal to the user. Yet another object of the invention is to provide a computer system wherein access is secure, yet designed to be convenient and easy for a consumer to use.

It is yet another object of the invention to further enhance fraud resistance by maintaining authenticating data and carrying out the identity verification operations at a point in the system that is operationally isolated from the user requesting access, thereby preventing the user from acquiring copies of the authenticating data or from tampering with the verification process.

Yet another object of the invention is to provide users and enterprise communication centers with a central, or master, computerized data processing center, containing an electronic identicator and an electronic clearinghouse, for storage, accessing, processing and presenting of biometric data and associated user-customized electronic communications. As such, it is an objective of the invention to enable users and enterprise communication centers to enter their customized data into a centralized database, such data to include user biometric samples, user demographics, user computer function preferences, and user on-line activity or browsing patterns, and user purchasing patterns. This thereby enables users and enterprise communication centers to have all such personal data uniformly updated by him and uniformly accessible to him regardless of the computing device the user is using at any one time.

Yet another object of the invention is to enable enterprise, or third-party, databases to correctly identify users and enterprise communication centers using the computer system so that their on-line activity patterns can be linked to the user's personal demographic database. In this way, the enterprise, or third-party, can more efficiently deliver services and information to pre-identified or interested users.

Another objective of the invention is that the enterprise, or third-party, database be identified by the computer system, wherein the enterprise, or third-party, database's identification is verified.

Another objective of the invention is to be added in a simple and cost-effective manner to existing computing terminals currently installed at points of usage and used over electronic communication networks, such as intranets, extranets, LANs, WANs, X.25, and the Internet. Yet another objective of the invention is to be efficiently and effectively operative with existing communications systems and protocols, specifically as these systems and protocols linked to the processing of electronic communications.

The present invention is significantly advantageous over the prior art in a number of ways. First, the present invention also improves the efficiency and accuracy of handling electronic communications by enterprise communication centers. With the identification of individual users via their biometric, the accessing, processing and presentation of electronic communications by enterprise communication centers can occur with more precision, shorter waiting periods, and better usage of workflow resources.

The present invention is also extremely easy and efficient for people to use because it eliminates the need for users to directly possess any personalized memory tokens such as magnetic swipe cards or personal computers with resident user-customized data, in order to access, process and present electronic communications. The present invention therefore eliminates the inconveniences associated with carrying, safeguarding, and locating such memory laden tokens. The user is now uniquely empowered, by means of this invention, to conveniently conduct their electronic communications at any time and from virtually anywhere without dependence upon any tokens which are easily stolen, lost or damaged.

The invention is clearly advantageous from a convenience standpoint by making electronic communications less cumbersome and more spontaneous.

Further, the present invention can significantly reduce the manufacturing and distributing costs of issuing and reissuing user-customized man-made memory tokens such as magnetic swipe cards, and smart cards, or even powerful desktop personal computers, thereby providing further economic savings to users and companies.

Further, the present invention even eliminates the traditional requirement for a user to directly possess and use the ultimate memory token, a desktop personal computer with resident user-customized data.

Further, the present invention is also clearly advantageous from a convenience standpoint of users by providing centralized database tracking and storage of user-customized demographics, preferences and on-line activity or browsing patterns, thereby making electronic communications significantly more accurately and more precisely user-customized.

Moreover, the invention is markedly advantageous and superior to existing systems in being highly fraud resistant. The present invention virtually eliminates the risk of granting access to unauthorized users by determining identity from an analysis of a user's unique biometric characteristics. The invention further enhances fraud resistance by maintaining authenticating data and carrying out the identity verification operations at a point in the system that is operationally isolated from the user requesting access, thereby preventing an unauthorized user from acquiring copies of the authenticating data or from tampering with the verification process. Such a system is clearly superior to existing token-based systems wherein authenticating information, such as biometrics or personal codes, is stored on and can be recovered from the token, and wherein the actual identity determination is potentially in operational contact with the user during the access process.

Further, the invention can be cost-effectively integrated with existing electronic communication systems currently installed in corporate intranets and over the Internet.

These and other advantages of the invention will become more fully apparent when the following detailed description of the invention is read in conjunction with the accompanying drawings.

DETAILED DESCRIPTION

Figure 1:
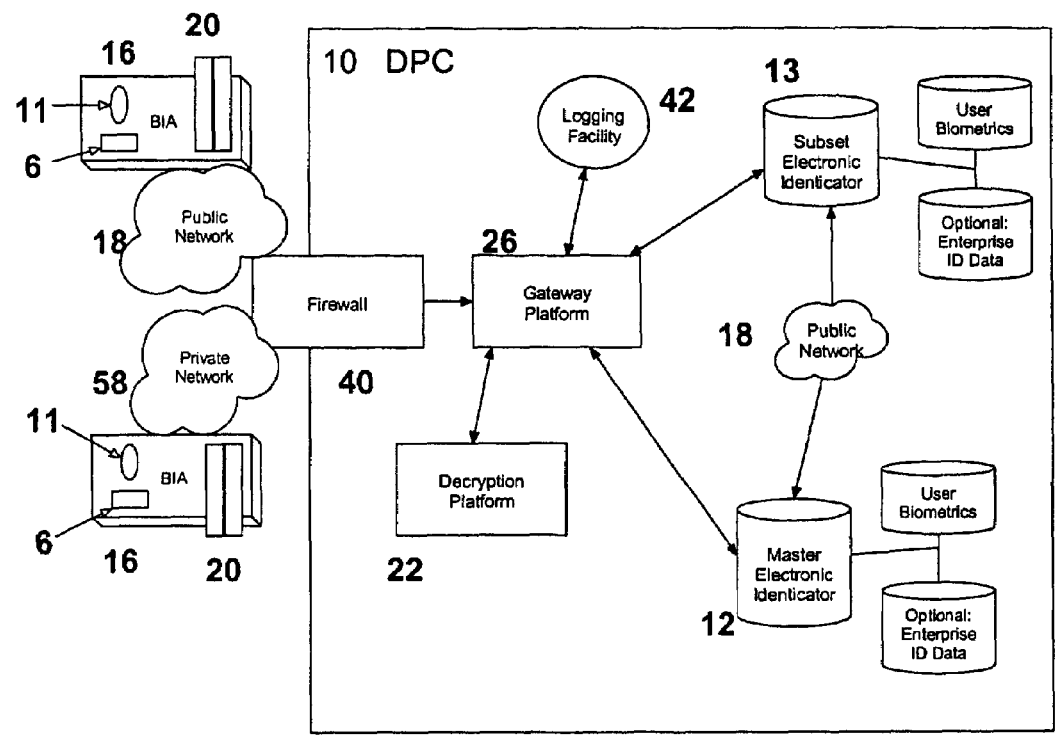
FIG. 1 shows a preferred embodiment of the invention having a biometric input apparatus that is connected a data processing center (DPC) through a private network and a public communications network. The data processing center has an electronic identicator and a rule-module clearinghouse.
Figure 2:
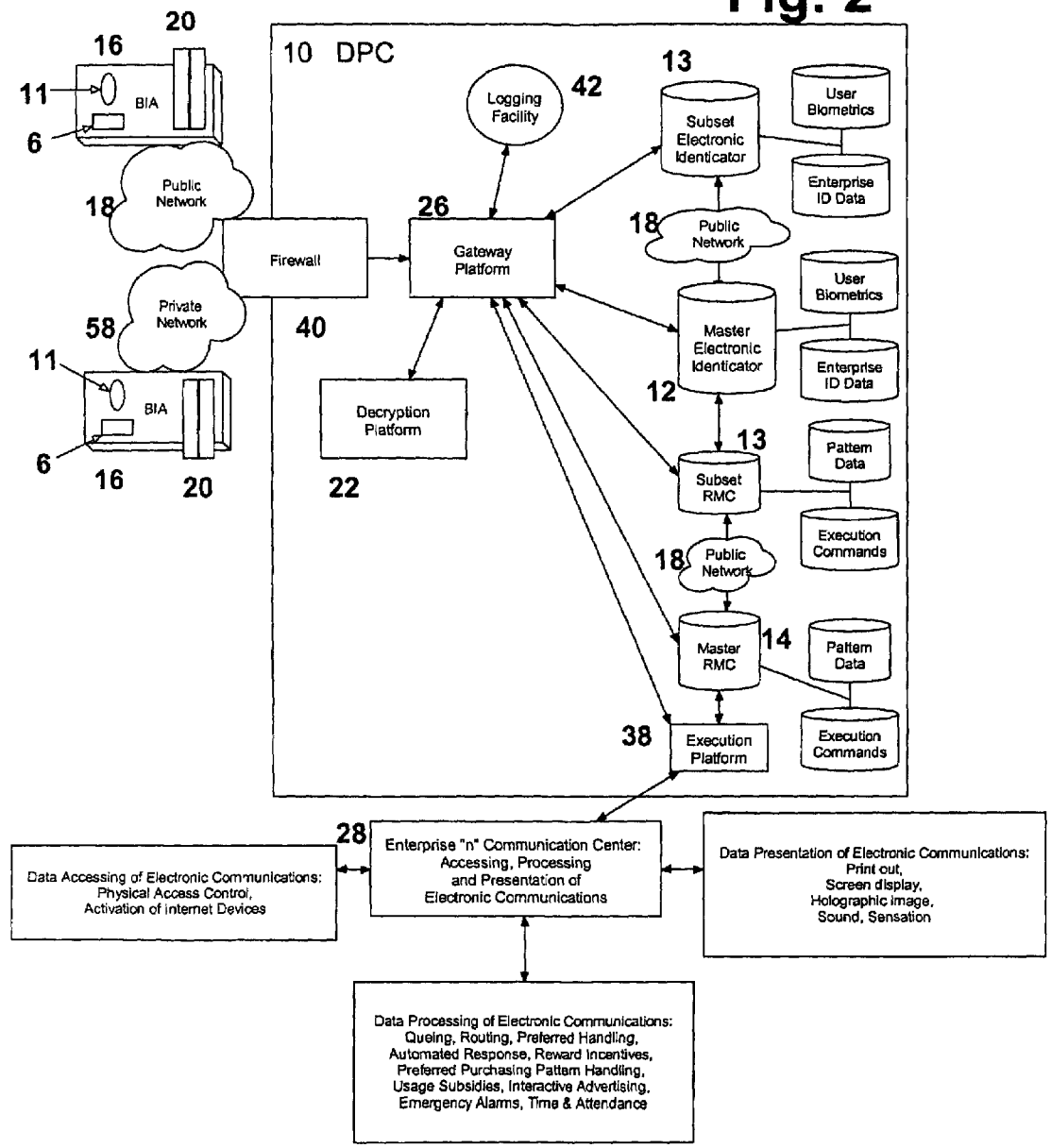
FIG. 2 shows a diagram detailing an embodiment of the invention with subset and master electronic identicators, and subset and master rule-module clearinghouses.
Figure 3:
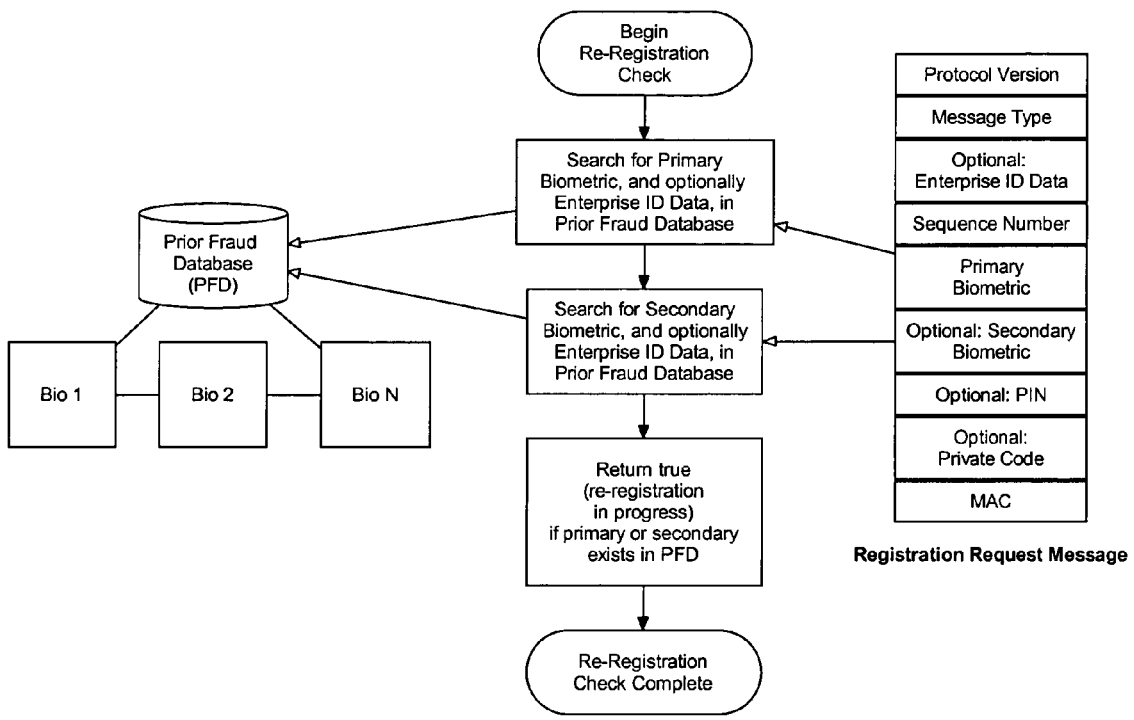
FIG. 3 shows a flow chart of the process of registering a biometric sample within the DPC.
Figure 4:
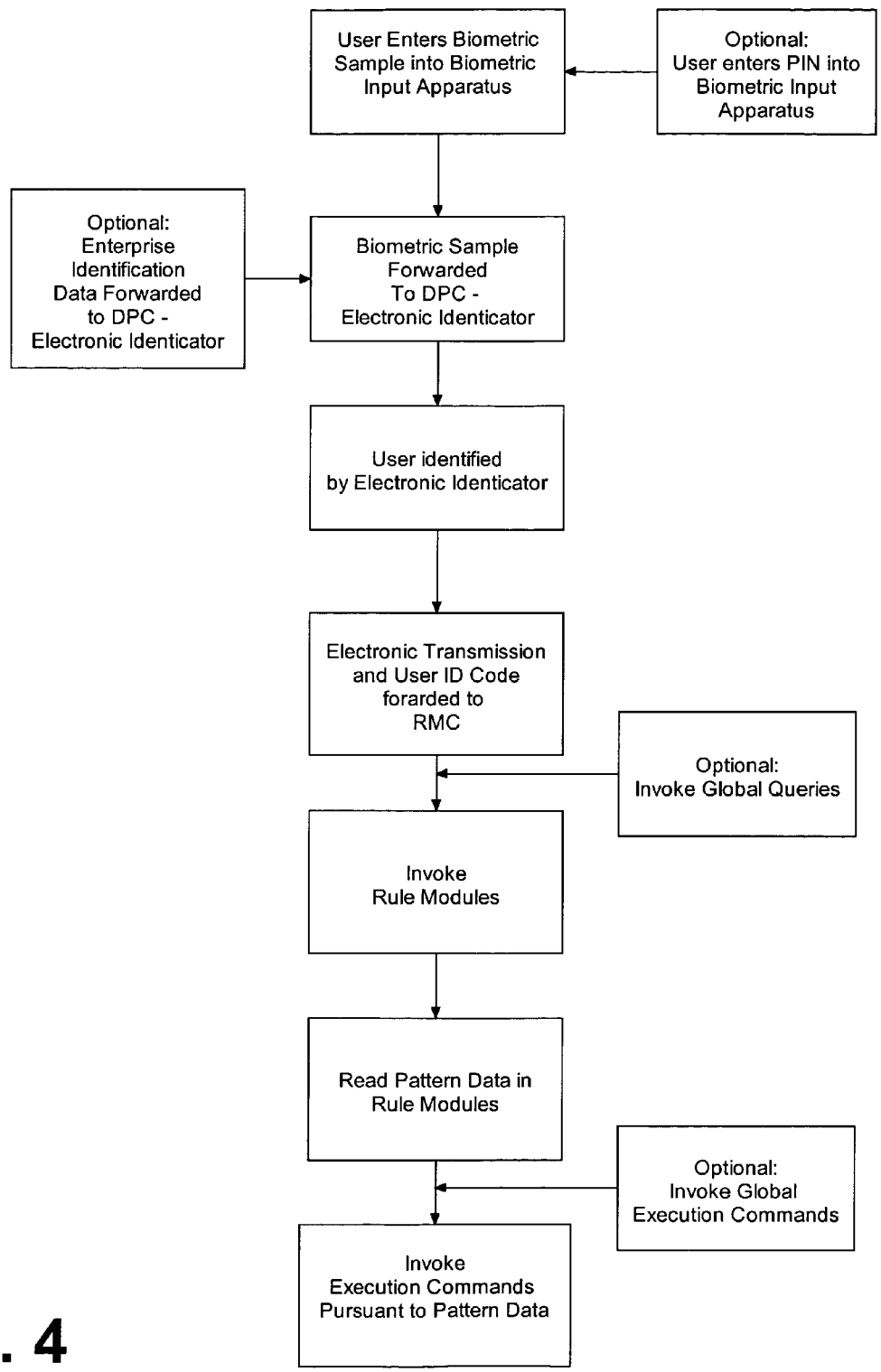
FIG. 4 shows a flow chart of the process of submitting a biometric sample to the DPC until an execution command of the identified user is executed by the execution platform.
Figure 5:
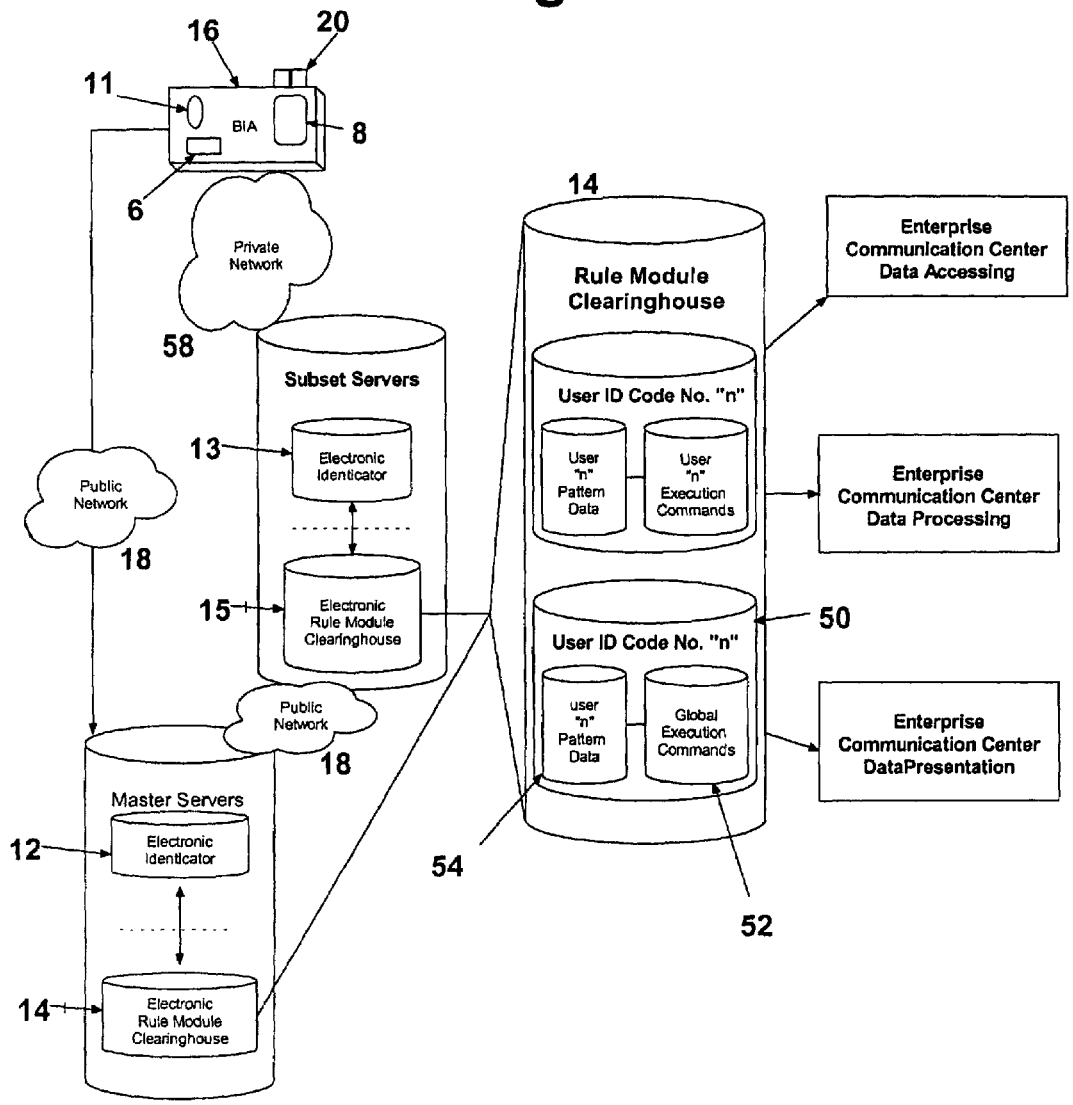
FIG. 5 shows the detail of the rule-module clearinghouse, with pattern data and execution commands within rule-modules.

The invention provides a tokenless biometric method and system for authorizing and executing electronic communications using a data processing center (DPC) 10, that has a Master Electronic Identicator containing an electronic comparator (Master Identicator) 12 and, optionally, a Master Electronic Rule-Module Clearinghouse (Master Clearinghouse) 14.

An enterprise is any legally formed entity, such as a corporation, a non-profit organization, and the like. An individual user is any person who electronically communicates with an enterprise, often as a customer or supplier of the products and services provided by the enterprise. An electronic communication is the accessing, processing, or presentation of any electronic data or content which does not in and of itself constitute or execute an electronic financial transaction wherein the exchange or alteration of any financial assets occurs. Examples of electronic communications include: the accessing, processing, or presentation of electronic data, such as word-processed content, mathematical spreadsheets, emails, visual or graphic images, audible content, software code, pattern data, execution commands, computer software programs, Internet web sites, software rule-modules, electronic instant messaging, and the like. Such electronic communications take many forms, including: an electronic request for user-customized or user-unique access to stored database content; an electronic request to customize the processing of data according to user-customized or user-unique criteria; and an electronic request to present or display data in a pre-determined, user-customized format. Electronic communications which enterprise communication centers handle often include voice telephone calls (both land-line and wireless), voice over Internet ("VoIP") electronic mail ("email"), data packets, and the like.

Further, as defined herein, an electronic communication comprises any of the following: an email communication, a telephone call, an encrypted data packet, an Internet telephony communication, and a facsimile. As defined herein, a platform is any of the following: a computing module, a computing server, a computer database.

The user forwards their biometric samples to the data processing center via biometric input apparatus (BIA) 16. Electronic communications of data, including the transmittal of the biometric samples from the BIA 16 to Master Identicator 12 optionally occurs over a public network 18, such as a wide area network (WAN). It is the essence of this invention that the user not present any man-made personalized tokens during an identification process in order for an electronic communication to be authorized. Such tokens include smart cards, magnetic swipe cards, or personal computers with resident user-customized data.

Tokenless biometric electronic communications are characterized by identifying the user with the user's bid biometric sample 62 submitted through a stand alone BIA 16 which is directly connected via dial-up, leased lines or wireless modem 56 to a public network 18, or through a BIA 16 incorporated to any client terminal such as a cell phone, a personal digital assistant (PDA), a desktop personal computer, a notebook computer, a thin-client, or other public terminal or kiosk such as an Automated Teller Machine (ATM). In a preferred embodiment, the user is identified through biometrics while enterprise, or third-party, databases 28 which are accessed to complete the electronic communication, are identified through the verification of a digital certificate issued by an authorized certifying authority. It is also In one embodiment, execution of a Rule-Module (RM) 50 or an Execution Command (EC) 52 by the Execution Platform (EP) 38 optionally results in a declined communication due to lack of an identifiable enterprise or third-party 28, a closed or inoperative enterprise or third-party database 28, or some other immediately detectable problem condition. If the communication is declined, the Clearinghouse 14 or the Identicator 12 transmits the decline notification back to the BIA.

In one embodiment, the BIA 16 is actually built-in and/or integrated with a personal computer, although the invention does not require that the personal computer contain any resident user-customized data, such as Pattern Data (PD) 54, Execution Commands 52 or private encryption keys.

In another embodiment, the third-party is a person who is a representative of an enterprise, such as a business entity, that has authorized the user to utilize the third-party databases 28 for data access, data processing or data presentation to complete the electronic communication.

An electronic communication is any transmission that allows for access of electronic data, processing of electronic data, or presentation of any electronic data. Such electronic communications take many forms, including a user-customized electronic request for access to stored database content, an electronic request to digitally sign data using a digital certificate, or an electronic request to present or display data in a customized format. In sum, an electronic communication is the accessing, processing, or presentation of any electronic data or content which does not in and of itself constitute or execute an electronic financial transaction wherein the exchange or alteration of any financial assets occurs.

Examples of electronic accessing of data include accessing databases with content or text, access to web sites, web site chat rooms, Internet educational courses, Internet games or game arcades, Internet examinations or tests, medical or health data, Internet-based software from application service providers (ASPs), and physical access authorization fields. Other such data access includes other databases that require membership such as extent of insurance coverage, airline frequent flier rules, health club membership privileges, concert seats, movie rentals, check verification, and electronic voting. The results of accessing electronic communications further include: activation of an internet-connected device, including turning on a personal digital assistant, an automobile, and a photocopy machine, and; entry to a secured physical space, including electronically opening a door and opening a briefcase with an embedded wireless connection to the Internet.

Examples of electronic processing of data include, intelligent search of a public network 18 to locate information (Pull Data), such as the retrieval of investment data and news regarding a specific company, the retrieval medical news about a specific topic, the retrieval of price quotes for services or products, the retrieval of mathematical spreadsheets, emails, visual or graphic images, audible content, software code, computer software programs, Internet web sites, electronic instant messaging, and the like.

Pattern Data (PD) 54, as used herein, is any data or information which is customized to a particular user ("user-customized"). Such Pattern Data includes user-customized demographic information, user-customized Internet search or browsing preferences, user-customized purchasing patterns, and the like. It should be noted that user-customized is different from user-unique. Electronic data or electronic communications which are customized to a user, or "user-customized", have been customized by or for a user, but is not necessarily unique to that user. Therefore, user-customized data which applies to one user can also apply identically to another user. However, electronic data or electronic communications which are unique to a user, or "user-unique", are distinctive and without equal, and hence are exclusive to that particular user.

An Execution Command (EC) 52, as used herein, is any computer software command which is associated with at least one Pattern Data 54.

Figure 6:
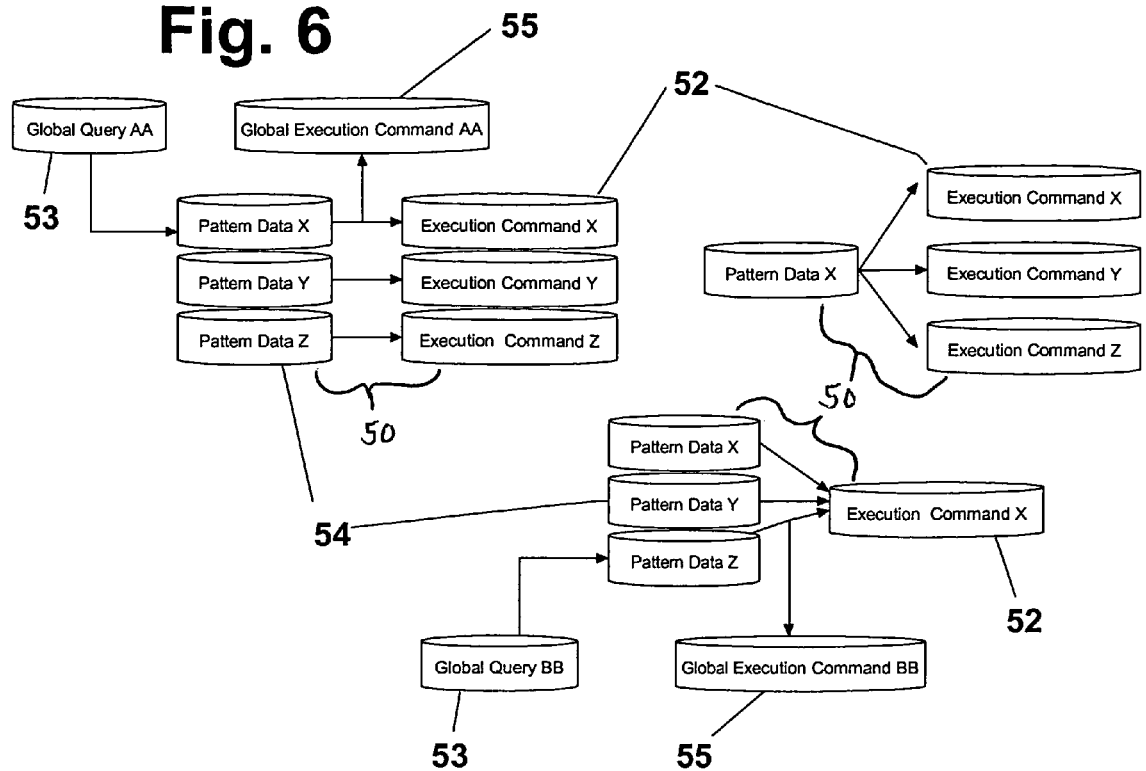
FIG. 6 shows various structures for association of pattern data and execution commands.
Figure 7:
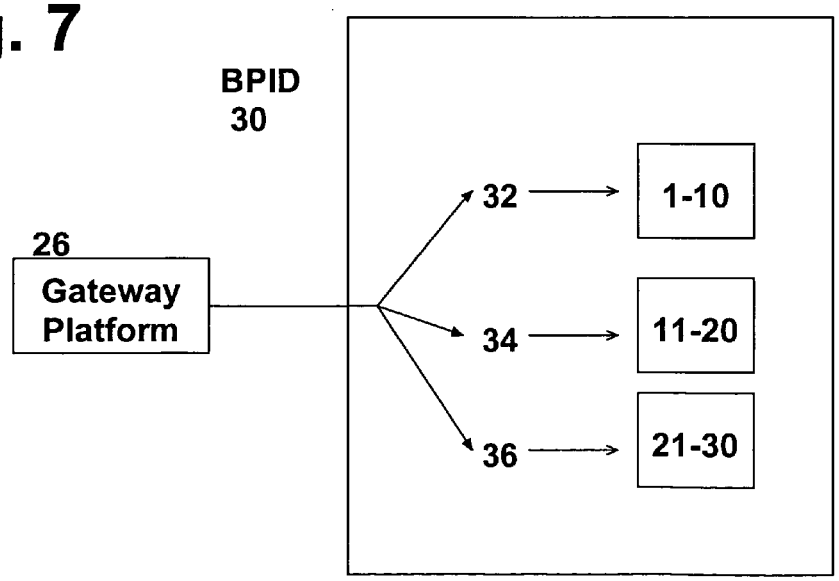
FIG. 7 shows the detail of an embodiment for search of a registered biometric sample database using personal identification codes.
Figure 8:
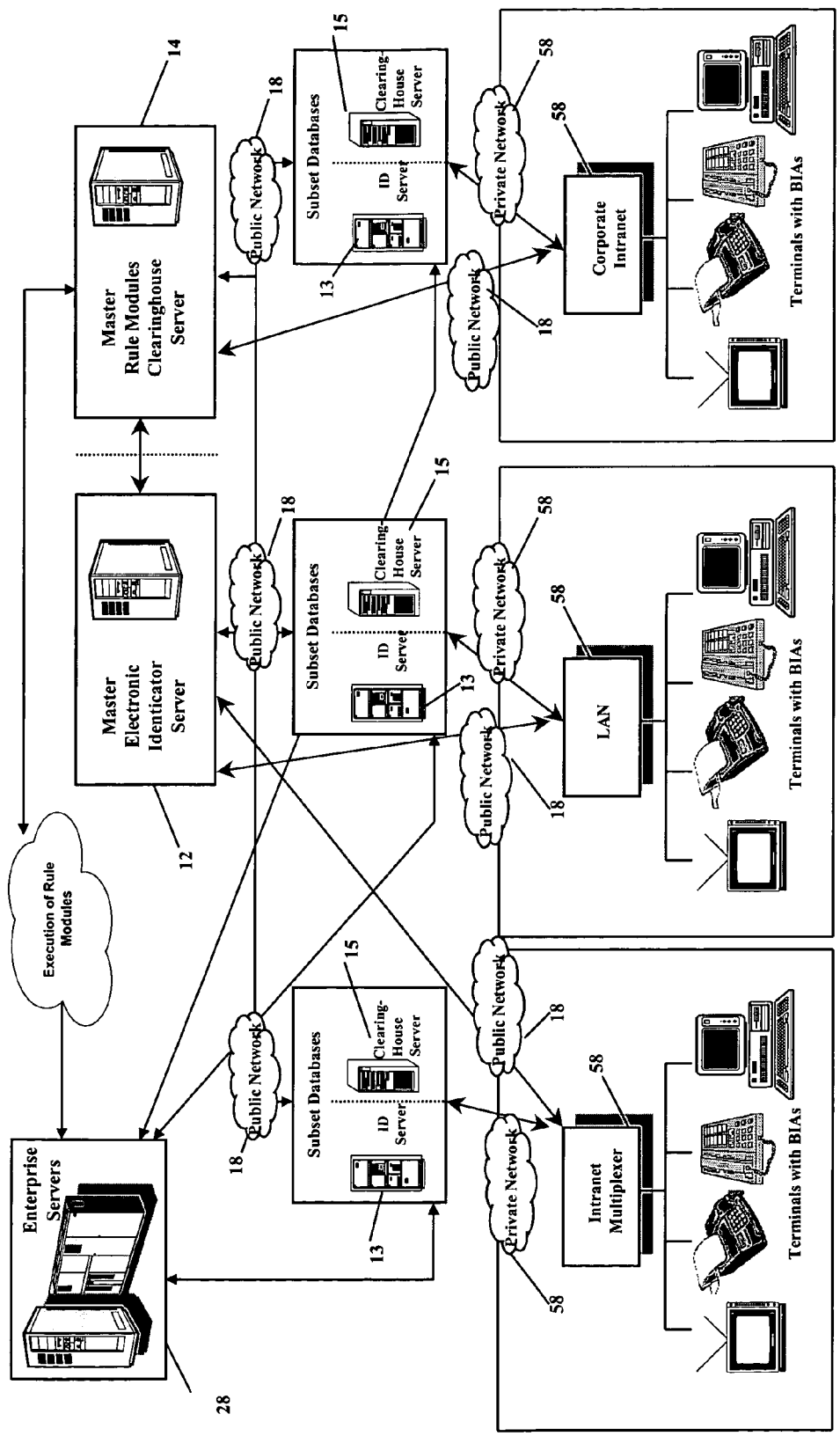
FIG. 8 shows the detail of an embodiment with multiple biometric input apparatus units, multiple subset identicators, and multiple subset rule-module clearinghouses.
Figure 9:
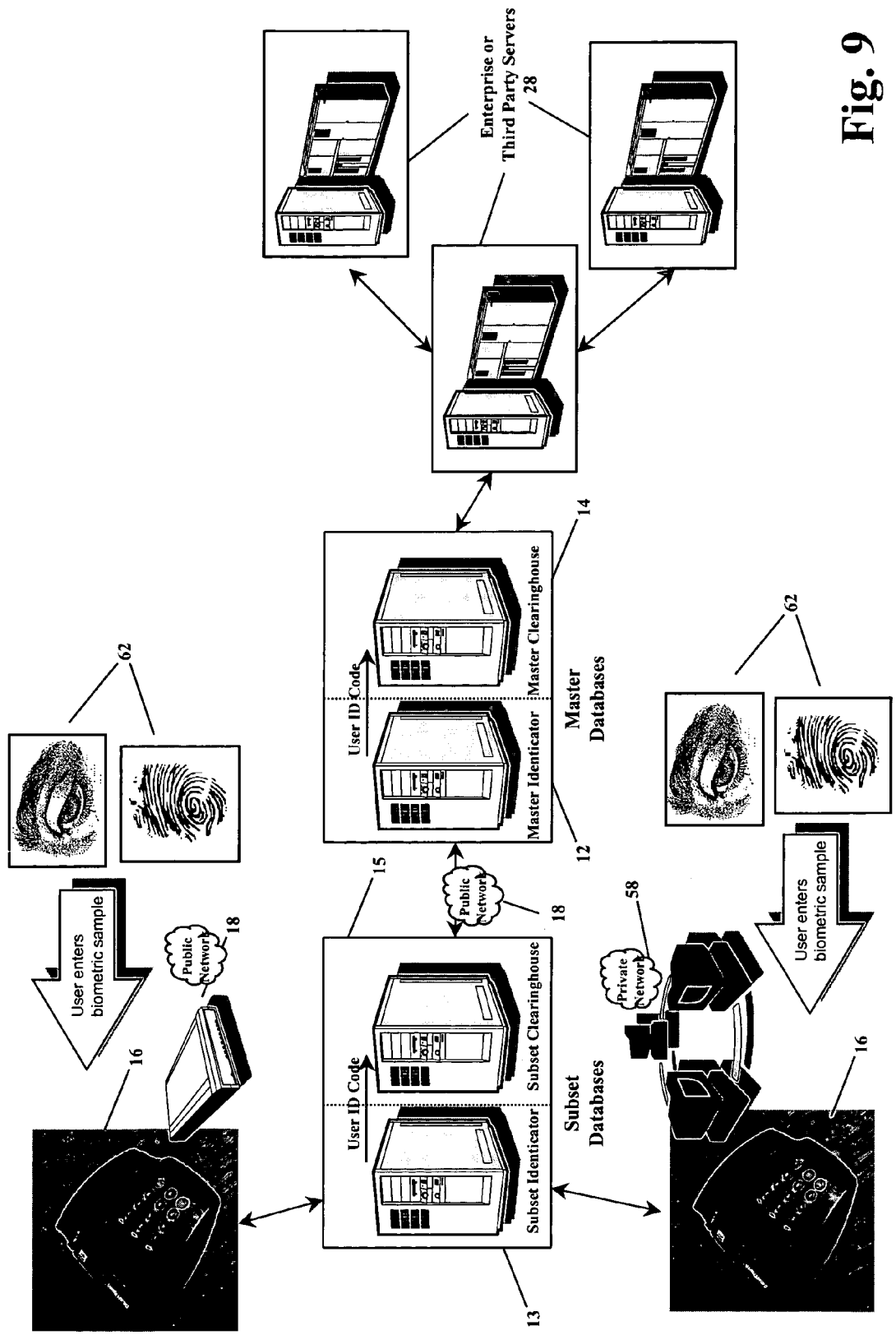
FIG. 9 shows an embodiment with a private network, a public network, subset and master identicators, and subset and master rule-module clearinghouses.

As shown in FIG. 6, a Rule-Module (RM) 50, as used herein, is any conditional association between at least one Pattern Data 54 and at least one Execution Command, whereby if a Pattern Data 54 matches data submitted by a user, at least that one associated Execution Command 52 is in turn invoked by that Pattern Data 54 in order to execute at least one electronic communication.

The Clearinghouse 14 is a database or registry of at least one Pattern Data 54 and at least one Execution Command 52 together forming at least one Rule-Module (RM) 50, and has the capability to delete, add or edit associations between any Pattern Data 54 and any Execution Command to delete, add, edit, or invoke any Rule-Module 50 in order to execute an electronic communication.

The system used for identifying the user by their bid and registration biometric samples comprises the following components:

Biometric Input Apparatus ("BIA")
Communication lines
Master Electronic Identicator Server containing an electronic comparator ("Identicator")

These components together allow a user to access, process or present an electronic communication without the user being required to present any man-made memory tokens such as plastic or paper cards, or a personal computer with resident user-customized data.

Biometric Input Apparatus (BIA)

The BIA 16 is a device that gathers biometric samples from users. Each BIA 16 conducts one or more of the following operations:

electronically gather biometric input or sample directly from the person of a user
gather a PIC code or password from a user
secure communication between BIA 16 and DPC 10 using encryption
secure storage of secret encryption keys
store and retrieve a unique BIA hardware identification code
secure enclosure & components from unauthorized tampering
present or display electronic messages and allows users to either view or hear an electronic communication message
scan a magnetic stripe card
allow parties to select and edit electronic communications.

Biometric input is gathered using a biometric sensor 11 located within BIA 16. Biometric sensor 11 is a finger image sensor, however it is understood that other types of biometric sensors such as iris scan, voice print, retinal scan, facial scan and others can be used.

For BIAs requiring a fingerprint sensor, the BIA 16 has a biometric fraud detection mechanism (not shown) that will assure that any biometric input gathered from the biometric sensor is from a real physical person, instead of a copy or replica.

For systems employing a personal identification code (PIC), the PIC is gathered using a keypad or PIC pad that is preferably located securely inside the BIA.

Communication security is provided by encryption using unique secret keys known only to that specific BIA 16 and the DPC 10, and the DES encryption algorithm, preferably triple-encrypted. Triple encryption means successive encrypt/decrypt/encrypt operations using two distinct 56-bit DES keys. This provides significantly higher security than a single encryption operation with one 56-bit DES key. Alternately, a public/private key system can also be used to encrypt information that passes between BIA 16 and DPC 10. Both DES and public key encryption is well known in the industry.

The BIA 16 also has secure memory that can store and retrieve the unique secret encryption keys used to enable secure communications with the DPC 10. In this embodiment, this is battery backed-up RAM that is set up to be erased whenever the tamper-detect circuitry reports that tampering has been detected.

To use encryption keys, a key management system must be employed to assure that both sender and receiver are using the same key. When using DES, a preferred key management system is DUKPT, which is well known in the industry. DUKPT is designed to provide a different DES key for each communication, without leaving behind the trace of the initial secret key. The implications of this are that even successful capture and dissection of a BIA 16 will not reveal messages that have previously been sent, a very important goal when the effective lifetime of the information transmitted is years. DUKPT is fully specified in ANSI X9.24. The DUKPT key table is stored in the secure memory.

Each BIA 16 preferably has a hardware identification code that is registered with the Master Identicator 12 at the time of manufacture. This makes the BIA 16 uniquely identifiable to the Master Identicator 12 in all communications from that BIA 16. The BIA hardware identification code is preferably stored in write-once memory.

BIA 16 physical security is assured by standard mechanisms. Preferably, these comprise tamper-detect circuitry, an enclosure that cannot be easily opened without visibly injuring the enclosure, erasable memory for critical secrets such as encryption keys, write-once memory for hardware identification, tight integration of all components, and "potting" of exposed circuitry.

Information such as the content of a communication, the identity of a user, or other communication-related information is displayed using an integrated LCD screen 6. It is preferable that the LCD screen 6 be connected securely to the other components in the BIA 16 to maintain security. Approval or cancellation of a communication is done using the BIA 16 keypad.

A magnetic stripe reader 20 is optionally used to read any information that is encoded on the magnetic stripe of a card. This is preferably used during initial registration of the user for efficient gathering of a user's registration with the DPC. Optionally, the BIA 16 also validates public key digital certificates. In one embodiment, public keys of a particular certifying authority are initially stored in the BIA 16 at the time of construction.

Although a preferred embodiment is described above, there are many different variations on specific BIA 16 implementations. Fundamentally any device that is secure, that can gather a biometric sample, and that can connect to the Master Identicator 12 via some form of communication line 18 can function as a BIA 16.

The BIA hardware identification code is not used to identify the user. However, once a user is identified by their biometric, the BIA hardware identification code optionally functions as Pattern Data 54 to invoke certain access, processing, or display commands in the Clearinghouse.

It should be noted that a BIA 16 machine is any device that electronically reads or scans a biometric sample 62 of a user. Example devices which can incorporate a BIA 16 include wireless pagers, cellular and standard telephones, on-line network computer terminals, on-line exercise machines that are connected to and can be accessed through a communications network, on-line electronic books which can download electronic text from an Internet site, on-line automated teller machines that are connected to a communications network such as a public network 18, on-line vending machines that are connected to a public network 18 or a private network 58, on-line information terminals or public kiosks at airports which are connected to a communications network such as a public network 18, on-line personal digital assistants such as Palm Pilots™, on-line photocopy machines that are either connected to a communications network such as a public network 18 or a private network 58, automobile embedded Internet-connected appliances which download preferred radio stations, seat and temperature adjustments, and the like, household appliances such as refrigerators, microwaves, and the like that are connected to a communications network such as a public network 18, home entertainment appliances including on-line television devices such as WebTV™, and compact disc audio systems and the like, which are connected to communications networks such as a public network 18, along with their respective remote controls.

Registration

A user typically registers at least one biometric sample 62 with the Master Identicator 12 via a BIA 16 device. Any user-unique biometric sample 62 can be registered including a fingerprint, a facial scan, a retinal image, an iris scan, or a voice print. Biometric samples gathered during the registration step are stored at a data processing center (DPC) 10. Preferably, all registration biometrics are stored in at least one Master Identicator 12, which contains all of the stored registration biometric samples from all of the users registered with the system. Registration biometric samples are transmitted from the BIA 16 to the Master Identicator 12 via a public communications network 18. Note that "intranet" or "private network" as defined herein is distinct from the "non-intranet" or "public network" as follows: an "private network" is a client-server computer system within an enterprise's own internal local area network. Such private networks 58 are often proprietary, secure and are, in and of themselves, communicationally isolated from other enterprise private networks; the "Internet", by contrast, is a vast public network which is composed of thousands of interconnected computers which is not proprietary to any single enterprise. Public network computers can also serve to interconnect separate enterprise private networks. As such, a public communications network, comprises any of the following: a cable network, a wireless cellular network, a wireless digital network, a telephone network, a wide area network, the Internet, an ATM network, and an X.25 connection. In particular, the Internet is made up of large backbone networks (such as MILNET, NSFNET, and CREN), and smaller networks that link to them.

At the time of registration of users, each user is assigned a User ID Code that is unique and exclusive to each user. The User ID Code is automatically generated by the DPC 10 to validate that a user's bid biometric sample 62 has matched with that user's stored biometric sample. The User ID Code is not known to the user. Further, the User ID Code is different from the Personal Identification Code (PIC) of the user. The user's Personal Identification Code is known to the user, and it is optionally presented to the Master Identicator 12 by the user during the identification process to increase the security and efficiency of the DPC's biometric matches.

The user optionally registers user-customized data with a Master Clearinghouse 14, which stores the complete set of rule-modules 50 from all registered users. Note that the Master Clearinghouse 14 comprises at least one server or computing platform, and can include several proximally located servers or computing platforms, interconnected via a private network 58, a local area network (LAN) and the like. Examples of user-customized data include Pattern Data 54, an Execution Command 52 (EC), or a Rule-Module 50 (RM). A Rule-Module 50 comprises at least one Pattern Data 54 which is associated with at least one Execution Command. These data are stored in the Clearinghouse 14 and are optionally registered by the user, by the Clearinghouse 14, by an authorized enterprise or third-party 28, or any combination of the above named parties.

Authorized enterprises or third-parties 28 optionally register identification credentials with the Master Identicator 12, in order to enable the Master Identicator 12 to authenticate to a specific user that their electronic communication has been correctly executed by the intended enterprise or third-party 28.

Examples of authorized enterprise or third-party 28 execution of electronic communications include accessing data in enterprise or third-party 28 databases or servers, processing data by enterprise or third-party databases 28 or servers, presenting or displaying data to the user by an enterprise or third-party database 28, or processing of data by the DPC 10. If the third-party is a person, the user can register a biometric with the Master Identicator 12. If the third-party is an entity or enterprise, such as a corporation, it can register a digital certificate with the Master Identicator 12. Third-party digital certificates are available from certifying authorities, and they provide the assurance that the entity with the certificate is the authentic owner of that identity. These certificates contain readable text and other information that describes the entity. These certificates include corporate logos, a corporate address, as well as the name of the enterprise.

BIA hardware identification codes are unique numbers assigned to BIA 16 devices at the time of manufacture. If an entity, such as a company, wishes all user-customized communications issuing from a given BIA 16 to be communicated to a particular intranet, the company registers any such BIAs 16 with the Master Identicator 12, which updates the BIA 16 device records.

Preferably, the security surrounding the registration of an entity's digital certificates or of the BIA hardware identification codes with the Master Identicator 12 is extremely strong, as this is a potential source for large losses over a short period of time.

A user registers with the Master Identicator 12, and at least one Pattern Data 54 which include a biometric sample 62, a biometric-PIC association, or any other registration data such as the user's demographics. To register, a user submits a registration biometric sample 62 provided by their physical person to the BIA 16. The BIA 16 determines that the biometric scan is non-fraudulent, and translates and compresses that biometric scan into a format suitable for rapid transmittal to the Master Identicator 12. In a preferred embodiment, the user enters a PIC code into the BIA 16 keypad. The BIA 16 transmits the registration data and identification data to the Master Identicator 12. The Master Identicator 12 inserts the biometric (or biometric-PIC) into the appropriate Master Identicator 12 database and generates a User ID Code that is unique to the user. From this point on, any time the user is identified by the Master Identicator 12, the user's User ID Code is forwarded to the Clearinghouse 14 and it invokes at least one Rule-Module 50 customized to that user. In the Clearinghouse 14 database, a Rule-Module 50 is created that is identified by the user's User ID Code. This enables the person to originate electronic communications.

In one embodiment, the Master Identicator 12 automatically assigns a new user-customized Clearinghouse 14 sub-database to a person's biometric, biometric-PIC, or User ID Code. Note that the Master Identicator 12 comprises at least one server or computing platform, and can include several proximally located servers or computing platforms, interconnected via a private network 58 or a local area network (LAN).

In one embodiment, there is a re-registration check step, wherein the user's registration biometric sample 62 is compared against previously registered biometric samples 62 wherein if a match occurs, the computer system is alerted to the fact that the user is attempting or has re-registered with the Master Identicator 12.

In another embodiment where a PIC is used for identification purposes, a biometric theft resolution step is preferably employed, to change a user's PIC when it is determined that a user's biometric sample 62 has been fraudulently used or duplicated.

Subordinated User Registration

In one embodiment, a user registers with the DPC 10 as a primary user. This means that the primary user can restrict, modify, or otherwise control a subordinated user's electronic communications to access, process or present electronic data and electronic content stored on various enterprise or third-party 28 Execution Platforms 38, or enterprise or third-party 28 databases. This can be desired, for example, when the primary user is a parent who wishes to influence or govern the on-line browsing activity of their minor child, who as the subordinated user is permitted access to certain desirable electronic databases while being denied access to undesirable electronic databases. In this embodiment of the invention, the primary user registers with the DPC 10 their biometric sample 62 along with the subordinated user's biometric sample 62. Separate and unique User ID Codes are issued by the Master Identicator 12 for the primary user and the subordinated user, respectively.

Once the subordinated user logs onto a network and is identified by the Master Identicator 12, the subordinated user's User ID Code is forwarded to the Clearinghouse 14 to identify the subordinated user's customized Rule-Modules 50. Additionally, in a Rule-Module 50 designated for the subordinated user, a Pattern Data 54 is constructed indicating that the user is in fact a subordinated user, and the associated Execution Command 52 dictates that the subordinated user's access limits, restrictions and priorities must be governed by Rule-Modules 50 of the primary user. In one embodiment, a subordinated user is prohibited by the primary user's Rule-Modules 50 from purchasing cigarettes and alcohol, or from accessing R-rated films being shown in theatres. If the primary user's Rule-Modules 50 are silent with respect to any particular subordinated user's requested electronic communication, the subordinated user's relevant Rule-Modules 50 will govern that electronic communication and permit the electronic communication to proceed unimpeded. In a different embodiment, a subordinate user can in turn have another subordinated user.

Because a user's biometric is used for identification purposes, even if a subordinated user attempts to re-register with the DPC 10 under a different name, a search of previous registration biometric samples will show that the registrant has in fact previously registered with the DPC 10 and is a subordinated user.

Communication Lines

Communications between the BIA 16 and the Master Identicator 12 occur via many different communication methods. Most depend on the particular communication networks already deployed by the organization or retailer that deploys the communication authorization system.

In an embodiment the BIAs 16 are connected via Ethernet to a local router, which is itself connected to a network operations center (NOC) via frame relay lines. At least one Subset Identicator 13 is located at the NOC. Messages are sent from BIA 16 to the Identicator using TCP/IP over this network. In another embodiment, the BIAs 16 are connected via a cellular digital packet data (CDPD) modem to a CDPD provider, who provides TCP/IP connectivity from the BIA 16 to a private network 58 to which at least one Subset Identicator 13 is attached.

In yet another embodiment, a BIA 16 is connected via a public network 18, to at least one Master Identicator 12. TCP/IP is used to transmit messages from BIA 16 to Master Identicator 12.

There are many different ways to connect BIA 16 to an Identicator, both tethered and wireless, that are well understood in the industry, including but not limited to: a private network 58, including a local area network ("LAN"), or; a public network 18, including the Internet, an extranet, and a wide area network ("WAN").

Data Processing Center

The Data Processing Center (DPC) 10 is comprised of an Electronic Identicator 12, an internal Execution Platform 38, a Firewall 40, a Decryption Platform 22, a Gateway Machine 26, a Logging Facility 42, and optionally a Rule-Modules Clearinghouse 14.

Electronic Identicator

The Master Electronic Identicator containing an electronic comparator (Master Identicator) 12 serves to identify the user in an electronic communication. The Master Identicator 12 uses the electronic comparator to compare a user's bid biometric sample 62 with previously stored biometric samples from registered users, in order to identify the user. If a bid biometric sample 62 is successfully matched against a registered biometric sample, and the user is positively identified, the User ID Code which had been assigned to the user during initial registration will be forwarded to the Clearinghouse 14. The User ID Code transmitted by the Master Identicator 12 is used by the Clearinghouse 14 to locate the Rule-Modules 50 that are customized to that user.

The Master Identicator 12 is connected to a public network 18 or a private network 58 using a firewall machine 40. Messages are sent to a Gateway machine 26, which is responsible for overseeing the steps required to process the communication, including forwarding the communication to the Master Identicator 12 and optionally the Master Clearinghouse 14.

Preferably, electronic messages transmitted between the BIA 16 and the DPC 10 are encrypted. For this, the communication processor uses the Decryption Platform (DP) 22, which utilizes the hardware identification code of the BIA 16 to identify the encryption codes that is required to decrypt messages from the BIA 16. Once decrypted, the identity of the user is determined using Master Identicator 12, which provides storage, retrieval and comparison of biometric samples 62.

In an embodiment, during the user identification step, the Master Identicator 12 requests the user to submit their PIC, and this PIC is used by the Master Identicator 12 in combination with the user's bid biometric sample 62 for purposes of validating the identity of the user.

In another embodiment, the Master Identicator 12 provides periodic user verification queries. In this embodiment, in order for a user to extend an on-line session, the user is requested by the Master Identicator 12 to verify themselves using any of the following: a user bid biometric sample 62 or Pattern Data 54, such as a personal identification code ("PIC").

In another embodiment, an enterprise or third-party 28 recipient of an electronic communication is also identified by the Master Identicator 12 using any of the following electronic verification: a third-party ID Code, a digital certificate, an Internet protocol ("IP") address, a biometric, a hardware identification number, or any other code, text or number that uniquely identifies the enterprise or third-party. In this way, the Master Identicator 12 is enabled to provide the user with confirmation that the correct enterprise or third-party received the electronic communication. Examples include confirming that the correct web site or remote database was accessed by the user, that the correct enterprise or third-party designee received the user's email or instant message, and the like.

In another embodiment, the Master Identicator 12 platform is integrated with the Clearinghouse 14 (Clearinghouse) platform.

In a preferred embodiment, more than one Master Identicator 12 provides fault tolerance from either natural or manmade disasters. In this embodiment, each Master Identicator 12 uses a backup power generator, redundant hardware, mirrored databases, and other standard fault tolerant equipment known in the industry.

Identification of the enterprise, or third-party, and the user optionally occurs using different methods, depending on the identification information that is provided by the BIA. The Master Identicator 12 has subsystems for each type of information that is received by the Master Identicator 12, and each subsystem is highly optimized to provide rapid identification as outlined below.

In a preferred embodiment, a Master Identicator 12 comprises subsystems that can identify parties from the following information:

biometric data and personal identification code (PIC)
    biometric data alone
    digital identification (digital certificates)
    BIA hardware identification code Biometric Identification Subsystem (BID)

In one embodiment of the Master Identicator 12, the BID subsystem comprises at least two BID processors, each of which is capable of identifying users only from their biometric sample.

In one embodiment, each BID processor contains the entire database of biometrics. To distribute the communications evenly across processors without undue effort, the Master Identicator 12 determines randomly which BID processor will be used for a given electronic communication, and delegates the identification request to that BID processor. That BID processor performs a search of its biometric sample database in order to find a matching registered biometric sample.

In another embodiment, other information is present that assists the BID processor in searching the database. For finger images, this includes information such as the classification of the image (whirl, arch, etc.), and other information about the finger ridge structure that is useful for selecting out biometrics that are not likely to match (or information on biometrics that are likely to match). Such biometric-based sorting and classification systems using mathematical algorithms, are known in the art for fingerprints and for other biometrics such as retina of the eye, voice print, and face vascular patterns.

Biometric comparisons are optionally conducted using samples from multiple biometrics. This includes the same type of biometrics from an individual such as fingerprint samples from different fingers, or different types of biometric samples such as a finger print and a voice print. In some embodiments, multiple biometrics are used to more rapidly and more accurately identify individuals.

Biometric-PIC Identification Subsystem (BPID)

In one preferred embodiment, the BPID subsystem 30 comprises at least two BPID processors, each of which is capable of identifying parties from their biometric and personal identification codes.

Preferably, the database of parties identifiable from biometric-PIC combinations is distributed equally across all BPID processors. Each processor is responsible for a subset of identifications.

The Master Identicator 12 determines which Biometric-PIC from the BPID subsystem 30 is responsible for a given subdivision of the biometric database. In one embodiment, one BPID 32 is responsible for identifying people with PICs 1-10, another BPID 34 is responsible for identifying PICs 11-20, and a third BPID 36 is responsible for identifying PICs 21-30. For example, all messages from the BIA 16 containing a PIC that equals the number 30 would be routed to BPID 36 for identification of the user.

Once a BPID processor receives a bid biometric sample 62 and PIC for identification, the processor searches through its database, retrieving all registered biometric samples that match or correspond to that particular bid PIC. Once all corresponding registered biometric samples are retrieved, the Master Identicator 12 compares the bid biometric samples obtained from the electronic communication to all retrieved registered biometric samples. If a match occurs, the Master Identicator 12 transmits the identity of the user or the User ID Code to the Clearinghouse 14. If no match is found, the Master Identicator 12 transmits a "not identified" message back to gateway machine 26 and to the logging facility 42.

Digital Identification Subsystem

In a preferred embodiment, the Digital Identification subsystem comprises multiple processors, each of which is capable of identifying an enterprise or third-party from their digital certificates. In this embodiment, digital certificates are used to perform digital identification of a third-party. Preferably, these include corporate web site addresses and certifying authorities only. Where possible, computers provide digital certificates for identification of the computer and users use their biometrics for identification of the user.

Verifying that a particular digital certificate is valid requires a public key from the certifying authority that issued that particular digital certificate. This requires that the digital identification subsystem have a list of certifying authorities and the public keys used to validate the digital certificates they issue. This table must be secure, and the keys stored therein must be kept up to date. These processes and others relating to the actual process for validating digital certificates are well understood in the industry.

BIA Hardware Identification Subsystem (BHI)

In a preferred embodiment, BIA hardware identification codes are translated into an enterprise or third-party identification by the BHI subsystem. This subsystem maintains a list of all BIAs manufactured. Preferably, when a particular user uses a BIA 16, that user's geographic location is identified by their use of that particular BIA 16 during that electronic communication session.

In another embodiment, the BIA hardware identification code does not serve to identify either the user or a third-party. This is the case in BIAs 16 installed in public venues such as airport terminals, Automated Teller Machines in banks, or computers with BIAs for home use.

User ID Code

A User ID Code is an electronic message transmitted to the Clearinghouse 14, which informs the Clearinghouse 14 that a user has been successfully identified, and instructs the Clearinghouse 14 to invoke the Rule-Modules 50 for that particular user.

Rule-Modules Clearinghouse

In a preferred embodiment, once the user is identified by the Master Identicator 12, the User ID Code is forwarded to the electronic Rule-Module Clearinghouse (Clearinghouse) 14 The Clearinghouse 14 instructs the Execution Platform 38 to take the necessary steps for executing the Execution Commands 52 that are associated with the Pattern Data 54 registered with the Clearinghouse 14.

Rule-Modules

The Clearinghouse 14 is comprised of at least one Rule-Module 50 which is indexed specifically to one or more registered users (hence, "user-customized"). Therefore, the Rule-Modules 50 are optionally not unique or exclusive to a single user. The Clearinghouse 14 functions as a central storage facility for registering, indexing, updating, and invoking various Rule-Modules 50, and their software components, and to refine and improve execution of electronic communications according to user-customized preferences and on-line activity patterns. Each of these Rule-Modules 50 is composed of at least one Pattern Data 54 which is associated with or electronically linked to at least one Execution Command 52. As defined herein, user-customized does not necessarily mean that any Pattern Data 54 or the Execution Command 52 is unique to a user, but rather that they are indexed to or are assigned to a specific user. As such, the same Pattern Data 54 or Execution Command 52 can be assigned to several specific users, and hence would not be unique to any one user.

The Clearinghouse 14 optionally stores user-customized Pattern Data 54 that is unassociated with any user-customized Execution Commands 52 and optionally stores user-customized Execution Commands 52 that are not associated with any user-customized Pattern Data 54. Therefore, such unassociated Pattern Data 54 or Execution Commands 52 are optionally stored within the Clearinghouse 14 until they are associated with a Pattern Data 54 or an Execution Command 52 together thereby forming an executable Rule-Module 50.

Once the user is identified by the Master Identicator 12, the User ID Code is forwarded to the Clearinghouse 14. The Clearinghouse 14 takes the User ID Code, optionally along with the BIA hardware ID code, the BIA 16 location data and the electronic communication request, and searches among the user's customized Rule-Module 50 to invoke all of the Pattern Data 54 relevant to the electronic communication being undertaken.

Pattern Data (PD)

As previously noted, Pattern Data 54 can be provided by the user while the Execution Command 52 for that Pattern Data 54 is provided by the Clearinghouse 14 or an authorized third-party, or the Pattern Data 54 provided by the Clearinghouse 14 and the Execution Command 52 by an authorized third-party 28, to form a single Rule-Module 50.

Pattern Data 54 of a user is stored electronic data, which is customized to at least one user. A single Pattern Data 54 includes any of the following stored user-customized electronic data: a personal identification code, which is optionally alpha-numeric; demographic information; an email address; a BIA hardware identification code; a financial account; the user's date of birth; a secondary biometric; a non-financial data repository account; a telephone number; a mailing address; purchasing patterns; data on pre-paid accounts or memberships for products or services; electronic data usage patterns; Internet browsing patterns; employee status; job title; pre-set data on a user's current activity patterns; a digital certificate; a network credential; an Internet protocol address; a digital signature; an encryption key; an instant messaging address; personal medical records; an electronic audio signature; and an electronic visual signature. Although a User ID Code is optionally used as Pattern Data 54, the User ID Code is unique to each user and is not shared between users.

Any such Pattern Data 54 can be provided to the Clearinghouse 14 by: the user, the Clearinghouse 14, or an authorized third-party 28.

Execution Commands (ECs)

The Execution Commands 52 executed by the Execution Platform 38 transmits electronic messages necessary for accessing, processing, or presentation of electronic data or content. Such communications include invoking a user's membership or eligibility for accessing insurance benefits (health, automobile, home, life, etc.), accessing travel service club benefits, accessing entertainment or travel event admittance, accessing electronic voting based on a user's place of residence, accessing electronic filing for taxes, and accessing privileges for permission to write paper checks or electronic checks.

Additionally, these Execution Commands 52 include activation and invocation of a user's privileges for accessing, processing or displaying stored database content. Such content includes word-processing files, spreadsheet files, software code, graphics files, audio files, medical records; activation and invocation of a user's privileges for accessing, processing, or displaying on-line content-rich media, wherein such media includes, but is not limited to, Internet web sites, on-line audio or graphical content, electronic game content, on-line chat content, on-line messaging content, on-line educational content, on-line academic examination-taking, on-line personalized medical and health content, server-based computer software programs and hardware drivers.

Any Execution Command 52 is invoked by any Pattern Data 54 with which it is associated. Execution Commands 52 are user-customized instructions or commands which include Execution Commands 52 governing data access privileges, Execution Commands 52 governing data processing, Execution Commands 52 governing data display or presentation.

In one embodiment, a single Pattern Data 54 is associated with multiple Execution Commands 52, thereby forming multiple Rule-Modules 50. Also shown in FIG. 6 is another embodiment, where multiple Pattern Data 54 are associated with a single Execution Command, again forming multiple Rule-Modules 50. Also shown in FIG. 6, another embodiment there is only one Pattern Data 45 associated with one Execution Command 52. Any user-customized Execution Command 52 can be provided to the Clearinghouse 14 by any of the following: the user, the Clearinghouse 14, or an authorized third-party 28.

There are several embodiments of user-customized Execution Commands 52 that govern access to electronic data such as web sites, web site content and databases. Each such Execution Command 52 is optionally invoked by the User ID Code serving as the Pattern Data 54. This Execution Command 52 is a software command that provides an authorized user access to any secured electronic data, such as those on enterprise or third-party 28 databases. Invoking this Execution Command 52 enables the user to simultaneously access all Internet chat or messaging forums, web sites and on-line database content to which the user has authorization.

In another embodiment, the enterprise or third-party being 28 contacted by the user for data access is also identified by the Master Identicator 12 using public/private key cryptography. Once the enterprise or third-party is successfully identified by the Master Identicator 12, this invokes a Rule-Module 50 in the Master Clearinghouse 14 which is unique to this enterprise or third-party 28 and which is used to confirms to the user that the correct third-party 28 database was accessed.

In another embodiment, an Execution Command 52 governing electronic communications for data access is a Universal Access Command (UAC) that is unique to the user. The Universal Access Command is an Execution Command 52 that activates an on-line or Internet-connected device, such as a wireless pager, a wireless or tethered telephone, a network computer, an exercise machine that is connected to a non-intranet, an electronic book, an on-line public access Internet terminal, an automobile or household appliance that is connected to a non-intranet, an Internet-connected personal digital assistant such as a Palm Pilot™, an on-line photocopy machine, an Internet-connected digital audio player such as the Rio™. In such instances, the executed Rule-Module 50 renders the on-line or Internet connected device operational and permits the user that has gained access using their biometrics to conduct on-line activity to control or otherwise access the above mentioned Internet connected devices. For example, in one embodiment, an exercise machine incorporates a BIA 16 and is connected to a public network 18. A user of the exercise machine enters their biometric sample, which is compared to registered biometric samples by the Master Identicator 12. Once the user is identified using their biometric samples, and the exercise device is identified using its hardware identification code, the Rule-Module 50 executes a command allowing the user to gain access to the exercise device. Optionally, additional Rule-Modules 50 allow a user to save the details of their exercise activity (number of times, weight amount, date of exercise, etc.) on that exercise device as Pattern Data 54, in order to keep track of past performance and as a template for future exercise routines.

In another embodiment, an Internet-connected electronic book that incorporates a BIA 16, is activated when the Master Identicator 12 successfully identifies the user. This allows the user to download text and graphics of complete novels or films for which they have previously paid.

In another embodiment, a personal digital assistant ("PDA"), such as the Palm Pilot™, incorporates a BIA 16. When activated after the Master Identicator 12 has successfully identified the user, the personal digital assistant permits the user to download and take on-line academic examinations. In another embodiments, a BIA 16 is incorporated in: an Internet-connected digital audio player such as the Rio™, whereby when activated as a result of successfully identification of the user by the Master Identicator 12, the Rio™ audio player permits the user to download music for which they have authorization. Optionally, additional Rule-Modules 50 can track how many pages of the electronic book have been displayed and can retain a bookmark for the most recently read page. Optionally, additional Rule-Modules 50 can track how many times a downloaded electronic audio track has been played.

In another embodiment, a BIA 16 is incorporated in: an Internet-connected medicine cabinet lock or gating mechanism; and Internet-connected door lock or gating mechanism. When activated as a result of successfully identification of the user by the Master Identicator 12: the medicine cabinet automatically unlocks via an electromagnetic locking/unlocking mechanism, and; separately, the door automatically unlocks via an electromagnetic locking/unlocking mechanism.

Upon the Master Identicator's 12 successful identification of the user from their bid biometric, other embodiments of Execution Commands 52 governing electronic communication access include permitting the user to access their health insurance account and validate their benefits to a health-care provider prior to being admitted to a hospital, to access their pre-paid entertainment account and validate to admittance personnel their eligibility to attend an entertainment event, such as a live music concert on a pre-designated day, at a pre-designated time and to sit in a pre-designated seat, to access their video club account and validate to a merchant their eligibility to rent videos under their pre-paid membership, to access their driver's license on-line and validate to an authority their eligibility to drive a car, to purchase restricted products like alcohol or tobacco, or to access a restricted entertainment event such as an R-rated film being shown in theatres, to access their credit-rating account and validate to a cashier their eligibility for check-writing privileges, to access an Internet web site and enter a real-time chat room with other people on-line.

Further embodiments of Execution Commands 52 governing electronic communication access include entitling a user to extend an on-line user-customized session by repeating their user-customized session log-in by entering either their biometric or at least one of their user-customized Pattern Data 54 when periodically queried to do so by the Master Identificator 12 or Clearinghouse 14, to access customized radio or television programming, wherein the user can be provided with customized programming, with or without time restrictions, that reflects pre-designated preferences, such as a channel broadcasting only news on companies in which the user has an investment or a channel broadcasting only music from Broadway theater shows which the user has seen or indicated a desire to see, to access restricted portions of corporate private network 58 databases on a selective basis, based upon pre-designated Pattern Data 54, such as the user's job title or company division, to access their travel reservations and validate to the admittance attendant that the user is eligible to travel, such as boarding a particular flight or a specific train, on a pre-designated day, at a pre-designated time, and to sit in a pre-designated seat, to access on-line position "papers" of user-customized political candidates and electoral ballot initiatives, and validate to an authorized enterprise or third-party 28 that the user is eligible to vote in particular elections, such as voting for a particular candidate running from a particular user-customized district.

There are several embodiments of user-customized Execution Commands 52 governing the processing of electronic data and electronic communications. Such Execution Commands 52 can govern: user-customized notification preferences for such electronic communications as real-time medical updates, pending Internet auctions, electronic stock trades and the like; user-customized instructions for user-location designating, for example, that the user can be located by enterprises or third parties 28 via whichever BIA 16 the user is using during an indicated time period, whereby the user can automatically receive their e-mails, instant messages, phone calls, faxes, and the like in real-time at the particular BIA 16 in use by him; user-customized travel customizations such as the user's preferences for lodging accommodations, travel costs, food, travel locations, and the like.

Further embodiments of user-customized Execution Commands 52 governing the processing of electronic data and electronic communications include: user-customized identity presentation preferences depending upon various pre-designated criteria such as the identity of a particular recipients, the user's sending location, and the like, whereby a user's pre-selected personal identifier, such as a distinct audio or visual sample, is electronically presented to an enterprise or third-party 28 recipient of the user's electronic communication; invocation of user-customized Internet environment preferences, whereby a user's preferences are used to create a customized Internet web portal with the user's preferred search engines, bookmarks, and the like; user-customized data presentation preferences, whereby the priority, formatting and organization of displaying data is pre-designated by the user; user-customized customization of Internet search engines, and; user-customized customization of intelligent data tracking and extrapolating software programs.

In one embodiment of an Execution Command 52 governing the processing of an electronic communication, the user-customized Internet search engine is customized to locate, retrieve and present electronic communications for the user using an intelligent tracking and extrapolating software program. In one embodiment, the user's customized Rule-Modules 50 provide instructions that even when the user is not logged onto a network, the Pattern Data 54 and Execution Commands 52 are periodically and automatically executed, added, changed or deleted based on the user's previous BIA 16 and on-line usage patterns. As a result, the user-customized search engine is automatically and progressively refined and customized to the user's evolving preferences and on-line activity patterns as tracked and interpreted by the user's own electronic, automated intelligent software program.

As an example of the above, the user's intelligent software program can direct the user's search engine to automatically conduct periodic, customized on-line data retrievals reflecting user-customized priorities for: product or service promotional offers or discounts via email or instant messaging; user-customized investment updates; user-customized medical or health information; competitive product or service pricings across a broad range of on-line merchants; hobby or recreational interests; interactive user-customized on-line advertisements, wherein product or service providers are permitted to provide unsolicited information to a user based upon certain user-customized criteria; on-line event calendaring, wherein a user is automatically notified of upcoming events or activities reflecting their interests.

Further, the intelligent software program can extrapolate from the user's existing preferences and on-line activity patterns to automatically and periodically recommend to the user new data that can expand or delete the user's Pattern Data 54 and Execution Commands 52 based upon the intelligent software program's algorithmic projection of what the user's on-line preferences and activities will be in the future.

In another embodiment, an Execution Command 52 functioning as an intelligent tracking and extrapolating software program centrally integrates data on the user's Internet browsing to provide user-customized recommendations on new products and services available from any number of Internet web sites or Internet merchants. Examples include the Execution Commands for retrieval of new types of music, books, and investment opportunities that reflect the user's preferences, but that such recommendations are pre-selected based on the Execution Command 52 having automatically conducted competitive price-comparisons from various enterprise or third-party 28 databases. In another embodiment, an Execution Command 52 integrates user-customized data from a user's calendaring or scheduling software program to provide the user with customized recommendations on user-customized offering for products, services or upcoming events based on the user's pre-scheduled activities in their on-line calendar.

In another embodiment, an Execution Command 52 appends a customized, user-customized audio or visual identifier which accompanies an electronic communication for presentation to the recipient. This identifier is appended to the user's electronic communication as a form of "electronic personal signature" to readily notify the recipient that the authenticated user sent the message. This identifier can be a unique biometric image or biometric sound sampled from the user, or it can be a non-biometric, distinct graphical or audio sample selected by the user to reflect their personal preferences, such as a cartoon image or a favorite sound or audio tone.

In another embodiment where greater security is required, an Execution Command 52 governs the appending of a user-unique network credential or digital certificate to an electronic communication. If a user employing a biometric seeks to append their digital certificate to an electronic communication, the user stores at least one command to sign electronic documents using their private keys, which are themselves centrally stored on an Clearinghouse 14 server. As such, the user's private keys are invoked as a header for the user's electronic communication which, in combination with the electronic document itself and an MD5 calculation of the document, together form a digital signature. At a later time, an authorized recipient can use the user's public key from the DPC 10 or a third-party certifier to verify the authenticity of the sender and the electronic document's contents to yield a secure, authenticated electronic communication. In this way, users do not have to manage their own private keys, nor do they have to retain physical possession of their digital certificates via smart cards or personal computers with resident user-customized data. In one embodiment, public keys of a particular certifying authority are initially stored in the BIA 16 at the time of construction.

In another embodiment, an Execution Command 52 governs the processing of an on-line, user-customized calendaring program or Internet calendaring web site, wherein the user's on-line scheduling calendar is automatically updated by the user-customized search engine and the user-customized intelligent search and tracking software program based upon user-customized Pattern Data 54. This could include, but would not be limited to, automatically updating the user's on-line calendar based on upcoming: user-customized entertainment events, user-customized business seminars, user-customized airline discounts to the user's preferred destinations, user-customized candidate and elections bulletins, and the like.

In another embodiment, the user pre-designates Execution Commands 52 governing the processing of electronic communications which filter the access and presentation of data when the user is subordinated user who is co-registrant or legal dependant of the primary user himself. Examples of such subordinated users are the children or the spouse of a user. Examples of such access and presentation, or viewing, filters can be restrictions pre-designated by the primary user governing: subordinated user access to Internet web sites with adult or violent content; subordinated user access to on-line television or radio programming with adult or violent content; subordinated user access to a public network 18 with restrictions covering on-line session length; subordinated user access to educational on-line resources which are automatically "pushed" to the subordinated user during a particular on-line session, as pre-determined by the primary user, in order to pro-actively circumscribe the content which a particular subordinated user is permitted to view or download.

In another embodiment, an Execution Command 52 provided to the Clearinghouse 14 by an authorized enterprise or third-party 28, such as a user's employer, governs the processing and prioritization of electronic communications to the user on a private network 58. As such, the Execution Command 52 determines which electronic communications are automatically "pushed" to the user during a particular on-line session, as pre-determined by the authorized enterprise or third-party 28, in order to pro-actively circumscribe the content which a particular user is permitted to view or download. Other embodiments include Execution Commands 52 processing electronic communications using: real-time tracking of an incoming caller or an email sender, a time and attendance monitoring program, a real-time challenge-response program, a call-center queuing prioritization program, a call-center routing prioritization program, an email-center queuing prioritization program, an email-center routing prioritization program, an automated caller or emailer response program, a call-forwarding program, Embodiments of user-customized Execution Commands 52 governing the display or presentation of electronic communications include controlling the organization and prioritization of on-line content such that text, audio, graphics and tactile sensations are displayed according to a user's pre-determined preferences. This includes displaying informational updates in a certain prioritization order, wherein user-customized regional news can be presented prior to national or international news, displaying expenditure records in user-customized categories which reflect anticipated tax deduction categories, such as home improvement expenses, charitable contributions, and the like, displaying customized user-customized Internet web sites or portals, including the user's pre-designated bookmarks, preferred web links, calendaring programs, email mail addressing rosters, multiple email accounts with their accompanying inbox messages, user-customized instant messaging "buddy" lists.

Other embodiments of user-customized Execution Commands 52 governing the display or presentation of electronic communications include: displaying accrued user-customized consumer rewards incentives or customized on-line advertising according to a user's prescribed priorities, such that skiing apparel is presented to the user at a time based on their calendaring program's designating their scheduled winter vacation or such that an advertisement for new coffee flavors from the user's preferred vendor is presented during the user's morning log-on session; displaying the user's customized fitness program on an Internet-connected exercise machine, whereby the user is reminded of the number of repetitions the user performed at what difficulty level during their last exercise session, and thereby also presents a recommended number of repetitions and a recommended difficulty level for the user's current session.

Other embodiments include Execution Commands 52 governing: presentation or display filters which circumscribe what text, graphic or audio content the user is permitted to view; presentation or display filters which govern which products or services a user is permitted to purchase, such as a subordinated user whose parent is a primary user, and where the subordinated user is prohibited from purchasing cigarettes, is limited in their selection of on-line merchants, is limited in the amount of on-line session time the user is permitted to have in a single day, and the like. Preferably, each identification request and each communication request, whether successful or not, is logged in the Logging Facility (LF) 42.

In a preferred embodiment, more than one Clearinghouse 14 servers provide fault tolerance from either natural or man-made disasters. In this embodiment, each Master Identicator 12 uses a backup power generator, redundant hardware, mirrored databases, and other standard fault tolerant equipment known in the industry.

Global Queries and Global Execution Commands

In one embodiment of the invention, the User ID Code matches Global Queries 53 which invoke user-customized Pattern Data 54 which in turn invoke Global Execution Commands 55. An example would be as follows: upon the Identicator 12 having successfully identified the user via his biometric sample 62, the Identicator 12 submits that user's unique User ID Code to the Clearinghouse 14. In this embodiment, all submitted User ID Codes automatically match to a set of Global Queries 53 in the Clearinghouse 14. For example, when any User ID Code is submitted, it matches automatically with Global Queries 53 such as the following: "What is the user's income level?"; "What that the user's home address?"; "What is the user's favorite carbonated beverage?". The answers to these Global Queries 53 are contained in the user-customized Pattern Data 54 which are statements that contain data customized to the user. In this example, the Pattern Data 54 responses to the above Global Queries 53 are, respectively, as follows: "Fifty-five thousand dollars"; "46 Shattuck Square, Berkeley, Calif."; "Pepsi-Cola". In this embodiment, these Pattern Data 54 responses invoke Global Execution Commands 55 which are, respectively: "Send the user a notice of newly allowable tax deductions courtesy of H&R Block® accountants"; "Inform the user via email that there is a sale on compact disc stereo systems at the Circuit City® retail store in Emeryville near his home"; "Notify the user that he is eligible to enter into the Pepsi-Cola® drawing for free apparel and sports accessories featuring the Pepsi Logo®". In this embodiment, therefore: the Global Queries 53 and the Global Execution Commands 52 apply automatically to any or all User ID Codes that are submitted to the Clearinghouse 14, and are non-specific, or non-customized, to any particular user; however, the Pattern Data 54 is specific to, or customized to, the specific user whose User ID Code has been submitted. In this manner, this embodiment renders a database architecture for the Clearinghouse 14 that has: user-customized sub-databases with user-customized Pattern Data 54; while the Global Queries 53 and the Global Execution Commands 55 sub-databases are not customized to any one single user.

Interconnections and Communications Between the Electronic Identicator and Rule-Module Clearinghouse In one embodiment, the Master Identicator 12 platform(s) can be physically distinct and separate from the Master Clearinghouse 14 platform(s) with each housed in independent servers or Platforms. In another embodiment, the Master Identicator 12 platforms(s) can be physically integrated with the Master Clearinghouse 14 platforms, whereby the Master Identicator 12 and Master Clearinghouse 14 are physically interconnected and integrated together within one server or platform. In both embodiments, communications between the Master Identicator 12 and the Master Clearinghouse 14 occur via many different methods and means that are well known in the art. Most depend on the particular communication networks already deployed by the organization or company that deploys the electronic communication authorization system.

In one embodiment, the Master Identicator 12 and the Master Clearinghouse 14 are connected via Ethernet to a local router, which is connected to a network operations center (NOC) via frame relay lines. Messages are sent between the Master Identicator 12 and the Master Clearinghouse 14 using TCP/IP over this network. In another embodiment, the Master Identicator 12 and the Master Clearinghouse 14 are connected via a cellular digital packet data (CDPD) modem to a CDPD provider, who provides TCP/IP connectivity from the Master Identicator 12 to a private network 58 to which at least one Master Clearinghouse 14 is attached.

In yet another embodiment, an Master Identicator 12 is connected via a public network 18, as is at least one Master Clearinghouse 14. TCP/IP is used to transmit messages from between the Master Identicator 12 and the Master Clearinghouse 14.

There are many different ways to connect the Master Identicator 12 and the Master Clearinghouse 14 that are well understood in the industry, such as cable TV networks, cellular telephone networks, telephone networks, the Internet, an intranet, a LAN, a WAN, or an X.25 network.

The Master Identicator 12, using an electronic comparator, automatically compares a user's bid biometric sample with previously stored biometric samples 62 from registered users.

The Master Identicator 12 and the Master Clearinghouse 14 hardware platforms are high-reliability database servers, well known in the art, such as those available from Sun™, Compaq™, Tandem™, IBM™ the like. Further, the Master Identicator 12 and the Master Clearinghouse 14 software can incorporate scalable database architecture, well known in the art, such as those available from Oracle™, Sybase™, Informix™ and the like.

Electronic Identicator and Rule-Module Clearinghouse: Master Servers and Subset Servers In a preferred embodiment, a Master Identicator 12 is responsible for storage of the entire set of biometric samples and digital certificates registered for use with this invention. In another embodiment, a Master Clearinghouse 14 is responsible for storage of the entire set of Pattern Data 54, Execution Commands 52, and Rule-Modules 50 registered for use with this invention.

Each Master Identicator 12 and Master Clearinghouse 14 site is preferably made up of a number of computers and databases connected together over a LAN (known in the industry). Multiple and redundant master computer sites ensure reliable service in the face of disaster or serious hardware failure at any single central computer site.

A subset identicator containing an electronic comparator (Subset Identicator) 13 store subsets of the entire set of biometric samples and digital certificates registered for use with this invention. A Subset Clearinghouse 15 stores subsets of the entire set of Pattern Data 54, Execution Commands 52, and related Rule-Modules 50 registered for use with this invention. Such data subsets are circumscribed by any number of criteria, including: usage location, usage frequency, usage recency, usage demographics and usage volume of electronic communications.

In one embodiment, when the user enters their bid biometric sample 62, and optionally bid personal identification code, into a first biometric input apparatus 16, the bid biometric sample 62, and optionally the bid personal identification code, is transmitted to a first Subset Identicator 13. The first Subset Identicator 13 contains a comparator which compares the bid biometric sample 62 against the subset of previously stored biometric samples 62 contained in the first Subset Identicator 13 to produce either a failed or successful first identification result. If the first subset computer returns a failed first identification result, the bid biometric sample 62, and optionally the bid personal identification code, is electronically transmitted via a public network 18 to a Master Identicator 12 for comparison of the entered bid biometric sample 62 to biometric samples 62 stored in the Master Identicator 12 to produce either a failed or successful second identification result. Optionally, the result of the first or second identification result is externalized from the computer system preferably to the user by a display unit 6.

Optionally, if the user individual is not identified by the Subset Identicator 13, and the Master Identicator 12 was able to produce a successful second identification result, the Master Identicator 12 transmits the identified registered biometric sample 62 to the particular Subset Identicator 13 which requested the identification, for storage.

In an embodiment, upon expiration of a previously determined time period from the most recent identification of an individual, the user's biometric sample 62, and optionally his personal identification code, is purged from the Subset Identicator 13. However, the user's biometric sample 62, and optionally his personal identification code, is not automatically removed or purged from the Master Identicator 12. This frees database space on the Subset Identicator 13 as well as reduces the number of biometric comparisons the Subset Identicator 13 has to perform for making an identification result. This, in turn, increases the accuracy and speed of the identification process. The user's biometric sample 62 and personal identification code, however, are stored with the Master Identicator 12 for future identification requests made by Subset Identicators 13 which have previously purged user biometric samples database, or by those subset Identicators who had never contained the biometric sample 62 of that specific user on their database.

Note that the Subset Identicator 13 can contain any subset of registered user biometric samples; such a subset can based on a user's demographics, geography, frequency, recency, purchasing patterns, on-line browsing patterns, and the like.

Optionally, in another embodiment there is at least one Master Rule-Module Clearinghouse (Master Clearinghouse) 14 and at least one Subset Rule-Module Clearinghouse 15. When a user is successfully identified by a Subset Identicator 13, the User ID Code is transmitted to a Subset Clearinghouse 15, informing the Subset Clearinghouse 15 that the user has been successfully identified, and instructing the Subset Clearinghouse 15 to invoke the Rule-Modules 50 for that particular user.

Additionally, the Rule-Module 50 invocation process commences at the Subset Clearinghouse 15 and Master Clearinghouse 14 after receiving the User ID Code. A first Subset Clearinghouse 15 attempts to produce either a failed or successful first Rule-Module 50 invocation result. If the first Subset Clearinghouse 15 returns a failed first invocation result, the User ID Code is transmitted via a public network 18 to a Master Clearinghouse 15 for an attempt to produce either a failed or successful second invocation result. Optionally, the result of the first or second invocation result is externalized from the computer system preferably to the user by a display unit.

Optionally, if user-customized Rule-Modules 50 are not successfully invoked by the Subset Clearinghouse 15, and the Master Clearinghouse 14 was able to produce a successful second invocation result, the Master Clearinghouse 14 transmits the user-customized rule-module to the particular Subset Clearinghouse 15 which requested the invocation, for storage.

In a preferred embodiment, upon expiration of a previously determined time period from the most recent rule-module invocation by an individual, the user-customized rule-modules are purged from the Subset Clearinghouse 15. However, the user-customized Rule-Modules 50 are not automatically removed or purged from the Master Clearinghouse 14. This frees database space on the Subset Clearinghouse 15 as well as reduces the number of searches the Subset Clearinghouse 15 has to perform for invoking a user-customized Rule-Module 50. This, in turn, increases the accuracy and speed of the Rule-Module 50 invocation process. The user-customized Rule-Modules 50 are stored in the Master Clearinghouse 14 for future invocation requests made by Subset Clearinghouses 15 which have previously purged user-customized Rule-Modules 50, or by those Subset Clearinghouses 15 who had never contained the Rule-Modules 50 of that specific user on their database.

Note that the Subset Clearinghouse 15 can contain any subset of registered user Rule-Modules 50; such a subset can based on a user's demographics, geography, frequency, recency, purchasing patterns, on-line browsing patterns, and the like.

Additionally, in some embodiments the invention has subset data processing capabilities, wherein multiple Subset Identicators 13 and multiple Subset Clearinghouses 15 exist, some of which store a subset of the total number of registered parties.

This system comprises at least one Master Identicator 12 and, optionally, one Master Clearinghouse 14, which contains a complete set of all data associated with parties registered with the system. The system further comprises at least two Subset Identicators 13 and two Subset Clearinghouses 15 that are physically apart from each other. Each Subset Identicator 13 and Subset Clearinghouse 15 contains a subset of data associated with parties registered within the Master Identicator 12 and Master Clearinghouse 14, respectively. Data communications lines allow electronic communications to flow, respectively, between each Subset Identicator 13 and each Subset Clearinghouse 15, and at least one Master Identicator 12 and, optionally, at least one Master Clearinghouse 14.

In all embodiments, the earliest successful identification of the party or parties involved in the electronic communication, along with the earliest invocation of the requisite Rule-Module(s) 50 permits the electronic communication to processed appropriately by enterprise or third-party 28 servers.

In order to make communications between the master servers and the subset servers secure, the system further comprises encryption and decryption means, wherein communications between the master servers and subset servers are encrypted.

Furthermore, each DPC 10, whether including master and subset servers, has electrical power backup and multiple redundancy in all of its critical hardware and database systems.

It is preferred that the master servers have a firewall 40 machine which is the entry point of data and messages into these computers, and a gateway machine which is a system coordinator and message processor.

Third-Party Computers

In one embodiment, an Execution Command 52 optionally requires the Clearinghouse 14 and the Execution Platform 38 to communicate with at least one third-party 28 computer or database, which could be located within and proprietary to another enterprise, to conduct the user's command. For example, when the Execution Platform 38 communicates with a host server located within an educational institution or an enterprise communication center, the enterprise or third-party 28 database stores research or user-customized account data which is accessed in order to complete the user's Execution Command 52.

Rule-Modules and Enterprise Communication Centers

A specific embodiment of how invoking Rule-Modules 50 results in Pattern Data 54 being used in conjunction with Execution Commands 52 will now be described. In this embodiment, the user's cell phone functions as a personal digital assistant containing a networked thin-client and a web browser (collectively referred to in this embodiment as the "PDA"). The PDA's voice-capable cell phone serves as the BIA 16 by using voice patterns as the biometric sample 62 for identification of the user by a Subset Identicator 13 located within an enterprise 28 database at an enterprise communication center.

Using his cell phone, the user calls the enterprise communication center from his car. The user is prompted via a challenge-response system to provide a voice biometric sample 62. An example of how this works would be to have an automated attendant challenges the user by prompting him to vocally articulate several randomly selected words or a randomly selected phrase, into the BIA 16 within the cell phone. In this case, the BIA 16 is the cell's phone microphone. The user's vocal articulations of the words or phrases capture the user's voice patterns and constitute the biometric sample 62 submitted to a Subset Identicator 13 in order for the user to be biometrically identified. Upon the successful identification of the user by the Subset Identicator 13, the user's User ID Code is forwarded by the Subset Identicator 13 to a Subset Rule-Modules Clearinghouse 15, similarly located within an enterprise 28 database at the enterprise communication center. Optionally, the enterprise 28 database forwards its enterprise 28 identification data to the Master Identicator 12 so that it is separately identified by a remote, trusted server within the system. In this embodiment, once the user and the enterprise 28 are successfully identified, the user's User ID Code and the enterprise identification code, respectively, are forwarded to the Subset Clearinghouse 15.

In this embodiment, the user has pre-designated authorization within the Subset Clearinghouse 15 that the DPC 10, upon its having successfully identified the enterprise 28, is permitted to forward the user's Universal Access Command to that particular enterprise communication center so that the enterprise's 28 database can assume the role of a proxy terminal on behalf of the user. The Universal Access Command is unique to each user and serves to enable access to all enterprise or third-party 28 databases and Execution Platforms 38, along with the Internet locations of the enterprise or third party 28, denoted as IP Addresses or Uniform Resource Locators (URLs) and the like, to which the user has pre-designated access privileges.

The DPC 10 forwards the user's Universal Access Command to the enterprise 28 database. The enterprise 28 database in turn uses the Universal Access Command to generate one-time usage Random Key Numbers (RKN), and to forward these Random Key Numbers to each and every one of the third-party 28 database URL locations which are relevant to the user, inclusive of the enterprise 28 databases within the enterprise communication center being used to handle the user's electronic communications in this embodiment. The third party 28 databases and the enterprise 28 databases will store the Random Key Number in Random Access Memory (RAM), and will erase them when the user's log-on session terminates. These Random Key Numbers are preferably sent from the enterprise 28 database to the other third-party 28 databases as encrypted 128-bit random numbers. The third party 28 databases each decrypt the Random Key Number and forward to the enterprise communication center all of the data relevant to the user. At this point, the enterprise 28 communication center's operator consoles are permitted to display or present all such URLs as text or preferably as visual icons for usage by the authorized operator at the enterprise communication center.

In this embodiment, the user has previously designated his user-customized Rule-Modules 50 in the Subset Clearinghouse 15 to display any or all related enterprise or third-party 28 database Pattern Data 52 and Execution Commands 54 in a grouped manner. In this embodiment, the Subset Clearinghouse 15 invokes user-customized rule-modules 50 that specify the accessing, processing and display of user-customized electronic communications. In this case, the display occurs on the operator's computer console screen at the enterprise communication center.

The user's Rule-Modules 50 designate that: all account data and product preferences relevant to the enterprise be grouped together and represented by the presentation of a single "messaging" icon or graphic on the BIA 16 display screen 6, and; all of the user's purchasing patterns, Internet browsing patterns, account payment schedules, and physical access privileges related to the given enterprise be presented in a text and icon screen display to the designated operator at the enterprise communication center. There are multiple operators at the enterprise communication center who handle inbound electronic communications and initiate outbound electronic communications on behalf of the enterprise. Each operator has an associated operator console that includes a personal computer or workstation and a telephone headset.

Once the user's electronic communication is received at the enterprise communication, the user's biometric identification and associated rule-modules 50 automatically invoke customized queuing and routing of the user's electronic communications. In this embodiment, the user's large purchasing volumes and good credit profile, warrant high prioritization for handling the user's electronic communication. The user's electronic communication is given both: preferential queuing for faster-response times, and; preferential routing to an operator trained in handling premier customers. This also enables the enterprise communication center to improve its work load balancing by providing flexible routing schemes based on the number of active operator consoles, comparative delay times, communication center service level commitments or other similar considerations.

In this embodiment, once the destination operator console has been designated, the rule-modules 50 customized for that user, encapsulating all of the information necessary for an operator to service the user customer, are displayed on the operator's console in several formats, including: dialogue or email scripts including automated responses; physical access privileges and authorization charts; medical data and emergency contact lists; call flow information; product purchasing patterns and pricing information, and; demographic data. The rule-modules 50 incorporate data from several recent interactions by enterprise representatives with the customer, including: an update on cable TV repairs in the field; physical access security service upgrades for the user's home; a recent purchase of flower arrangements for the user's wife, and; an on-line physical examination, including electro-cardiogram and blood pressure measurements, and changes in the user's medications regime.

At this time, the console operator checks with the user to ensure: that he is satisfied with the new cable service; that he has complied with the day's medication regime, with the operator thereby scheduling an automated email and phone call reminder to the user that, per his physician's previously authorized instructions, his medicine dosages will change in two days, and; that he has successfully entered his home earlier in the day per the physical access security upgrade. The operator thereby updates the user's customized files in the enterprise communication center database 28. The user then decides to order another floral arrangement, and the operator transfers the call to an automated attendant which, having the user's identification already established, employs a user-customized voice-recognition system to process the order. This system permits the user to say: "Mom", and the system invokes the user's customized rule-modules 50 to bring up the previously stored floral preferences, address, phone number, availability times for the user's mother, and; "Visa™ charge", and the system can invoke the user's previously stored credit account data to process the purchase.

In this embodiment, the user further says: "Orlando Hilton, December $3^{rd}$ through $5^{th}$", and the system automatically contacts the third-party 28 Hilton reservations database. Invoking the previously stored user-customized rule-modules 50, the user's preferences for room accommodations, room service food preferences and Hilton rewards-linked charge account are selected by the third-party 28 Hilton database to process the reservation. Once the user's charge has been approved, the third-party 28 Hilton database automatically logs: the user's newly accrued Hilton rewards points, and; the user's physical access privileges with the Orlando Hilton's Subset Clearinghouse 15 so that, upon arrival, the user can access his room, the health spa, and the garage.

In this embodiment, at this point the user has arrived at his home and reaches his front door. The user says: "Home access", and using Global Positioning System ("GPS"), the BIA's 16 location, and the user's biometric identification, the enterprise communication center's automated attendant now confirms the user is at the front door to his home. The third-party enterprise 28 communication center's database sends a Random Key Number to the URL of the electrical apparatus controlling the lock/unlock function at the front door, along with the user's electronic communication request to enter the physical space. An Execution Platform 38 located at this URL: provides the DPC with the front door's embedded BIA 16 hardware identification code, and; queries the DPC 10 to validate the Random Key Number it has received. If the DPC 10 confirms that the BIA 16 hardware identification code and the Random Key Number are current and valid, the DPC 10 invokes the access privileges for that user. The DPC 10 provides this data to the URL, along with validation of the Random Key Number. In this way, the user's front door, using an electromagnetic repulsion gating mechanism, is automatically unlocked, his home alarm system is disarmed, and he is permitted to enter his home. Preferably for security, this particular Random Key Number would be good for only one on-line session by the user. Once inside his home, the user's front door is automatically locked again using an electromagnetic attraction gating mechanism, and his home alarm system is automatically re-armed.

In another embodiment, should the user have had concerns for his safety upon arrival at his house, he could used the BIA 16 in his cell phone to vocally articulate a special word, code or phrase which would have alerted the enterprise communication center to a potential emergency situation. The enterprise 28 databases would then automatically contact local authorities to dispatch assistance to the user's location, along with providing notification of any user-customized Rule Modules 50 pertaining to medical care, insurance coverage and the like.

In essence, in this embodiment, via the user's voice pattern biometric 62 log-on, a thin-client PDA without resident user-customized data and without extensive resident software, is enabled to employ an enterprise 28 database as its proxy terminal in order to perform sophisticated on-line computing capabilities that are customized for the user, complete with user-customized electronic communication accessing, processing and presentation. Further, the enterprise communication center was enabled to customize its handling of the user's electronic communications, and deliver services more quickly and more accurately to the user.

Rule-Modules and Electronic Communications

Another specific embodiment of how invoking Rule-Modules 50 results in Pattern Data 54 being used in conjunction with Execution Commands 52 will now be described. A user logs on by submitting their biometric to a BIA incorporated into a public kiosk. In this embodiment, the public kiosk itself is a computer terminal containing a networked thin-client and a web browser (collectively referred to in this embodiment as the "kiosk"). The BIA 16 forwards the user's bid biometric sample 62 to the DPC 10 for identity verification. Once the user is successfully identified by a Master Identicator 12, the user's User ID Code is forwarded to the Master Rule-Modules Clearinghouse 14. Optionally, the BIA 16 also forwards its BIA hardware identification code to the DPC 10 for identification of the BIA 16 by the Master Identicator 12. In this embodiment, once the BIA 16 and the user are successfully identified, the BIA hardware identification code is forwarded to the Clearinghouse 14 along with the user's User ID Code. The Clearinghouse 14 is able to geographically and electronically locate the user via either the BIA hardware identification code, or the Internet Protocol (IP) Address (well known in the art).

Once the user logs on to the BIA 16 at the kiosk and is successfully identified by the Master Identicator 12, the DPC 10 forwards the user's Universal Access Command to the BIA 16. The Universal Access Command identifies all enterprise or third-party 28 databases and Execution Platforms 38, along with the Internet locations of the enterprise or third party 28, denoted as IP Addresses or Uniform Resource Locators (URLs) and the like, to which the user has access privileges.

In an embodiment, the DPC 10 forwards to the kiosk a user-customized display, presenting visual icons representing URLs for viewing by the user via the kiosk screen. In this embodiment, the following icons are presented to the user: a "Calendaring" icon, representing the user's centralized scheduling programs and customized scheduling; a "Messaging" icon, representing the user's centralized Internet accounts for email, voicemail, and fax; an "Academics" icon, representing the user's private academic coursework examinations account; a "Medical" icon, representing the user's centralized private health and medical records; a "Reading" icon, representing the user's centralized electronic books accounts; a "Games" icon, representing the user's centralized Internet game accounts; a "Word Processing" icon, representing the user's centralized accounts for word processing programs and user-edited content, and; a "Buddy List" icon, representing the user's centralized instant electronic messaging accounts.

The DPC 10 forwards to the BIA 16 a unique, one-time usage Random Key Number (RKN), optionally one for each and every one of said enterprise or third-party 28 database Internet locations which are relevant to the user. The BIA 16 will store the Random Key Number in Random Access Memory (RAM), and will erase them when the user's log-on session terminates. These Random Key Numbers are preferably sent from the DPC 10 to the BIA 16 as encrypted 128-bit random number. The BIA 16 decrypts the Random Key Number and forwards it to the kiosk. At this point, the kiosk is permitted to display or present all such URLs for the user as text or preferably as visual icons.

Note the user can have previously designated his Rule-Modules 50 in the Clearinghouse 14 to display any or all such enterprise or third-party 28 database locations in a grouped manner. In this embodiment, for example, the user's Rule-Modules 50 can designate that all email, voicemail, and fax URLs be grouped together and represented by the presentation of a single "messaging" icon or graphic.

In this embodiment, when the user clicks on a particular icon and seeks to log into a particular URL of an enterprise or third-party 28 database, or to all of the URLs for enterprise or third-party 28 databases represented by that icon, the kiosk or the DPC 10 sends the Random Key Numbers to all of the respective URLs designated by the icon, along with the user's electronic communication request. Execution Platforms 38 located at each of these URLs query the DPC 10 to validate the Random Key Number it has received. If the DPC 10 confirms that the Random Key Number is current and valid, the DPC 10 invokes each Execution Platform 38 pertinent to all of the user's relevant URL account number and access privileges for that enterprise or third-party 28 database. The DPC 10 provides this data to the URL, along with validation of the Random Key Number. In this way, the user is automatically permitted by each of the respective URL Execution Platforms 38 to access that URL and its associated enterprise or third-party 28 databases.

Also in this embodiment, the user's Rule-Modules 50 specify that the BIA 16 location can be used by the Clearinghouse 14 to enable the Clearinghouse 14 to automatically customize certain electronic communications for the user in real-time. For example, in this embodiment, the user clicks on the "Calendaring" icon. The kiosk requests the DPC 10 to access the user's Rule-Module 50 in the Clearinghouse 14 governing customized scheduling data. The relevant Rule-Module 50 uses the BIA's 16 location along with the user's Rule-Modules 50 to access third-party Execution Platforms 38 and enterprise or third-party 28 databases that optionally forward to the kiosk user-customized, geographically-specific scheduling data for presentation to the user. Such scheduling data includes where in the local area the user can find their pre-registered preferences for culture, travel accommodations, and business manifested in locally available radio stations, hotels, films, theatres, museums, business events, companies in which the user might be interested, book readings, university lectures, friends whom the user can want to contact, and local sales calls the user can wish to make. Further, the user's calendaring priorities, highlighting local appointments, can be displayed for their review. In this way, the user is immediately familiarized with the locality in which the user finds himself using a BIA 16, with the scheduling data automatically reflecting their customized, personal priorities.

In this embodiment, the user's Rule-Modules 50 stipulate that even when the user is not logged onto a network, certain of the user's Rule-Modules 50 are to function on an automated basis, such as periodically updating the DPC's 10 central retrieval of the user's email, voicemail and fax messages. In this way, when the user does actually log-on seeking to access this data, it is also available from the DPC 10 in real-time.

Further, in this embodiment, the user on the "Messaging" icon to access all of their email, Internet fax and Internet voicemail messaging accounts. The "Messaging" icon, represents all of the URLs related to the user's messaging accounts which have been grouped by the Clearinghouse 14 according to the user's Rule-Modules 50. The user has previously stored with the Clearinghouse 14 their messaging account URLs along with their respective account names and passwords. Once the user clicks on the kiosk's "get new messages" icon, the kiosk requests the DPC 10 to access the user's messaging accounts. Once this request is received by the DPC, the Clearinghouse 14 invokes the user's Rule-Modules 50 governing message requests. Assuming the user wants to simultaneously obtain all of their messages at once, the DPC 10 in turn sends a HyperText Transfer Protocol (HTTP) "get" message command for each URL, thereby enabling the DPC 10 to retrieve all of their email, Internet voicemail and Internet fax account messages at once. (Note that HTTP is the protocol currently used to transfer information from Internet third-party databases 28 to client browsers.) These messages are the Pull Data retrieved by the DPC. The DPC 10 filters the HyperText Markup Language (HTML) to retain only user-relevant message contents and forward this to the kiosk for presentation to the user.

In the embodiment, the user also seeks to simultaneously retrieve their standard voicemail messages. This can be accomplished by the user storing their voicemail account numbers and respective passwords as part of Execution Commands 52 in the Clearinghouse. Once the user signals the kiosk to "get standard voicemail messages", this request is forwarded to the DPC 10 which places dial-up calls to the relevant voicemail systems in order to record and digitize the voicemail message playbacks. The DPC 10 forwards these messages to the PDA for presentation to the user either as text or real audio.

In this embodiment, one of the user's invoked Rule-Modules 50 that provide calendaring functions, the kiosk automatically presents the user with an "Academics" icon for notification that they must complete their university's on-line coursework examination. In this embodiment, the DPC 10 provides the BIA 16 with a packet containing the Universal Access Command, the Random Key Number, and any other relevant user-unique network credentials for the university's restricted database. The BIA 16 decrypts this packet and forwards it to the kiosk for display to the user. The user clicks on the displayed icon representing the URL for the third-party Execution Platform 38 and databases at which resides the examination for which the user has pre-registered. The kiosk forwards Random Key Number to the URL, and the resident Execution Platform 38 queries the DPC 10 to authenticate the validity of the Random Key Number. If the DPC 10 confirms the validity of the Random Key Number to the URL, the user is enabled to access the third party database and take their electronically stored course exam. Preferably for security, this particular Random Key Number would be good for only one on-line session by the user with the relevant third-party database, in this case being the university server on which is stored the course examination.

In this embodiment, the user also clicks on the "Medical" icon to access their private health records in order to check on medical tests which their physician had completed that morning, along with accessing a customized collection of current medical news. Preferably, while the user was logged off, the user's relevant Rule-Module 50 automatically and periodically directed the Execution Platform 38 to collect this data from third-party databases 28. In this instance, the DPC 10 provides the BIA 16 with a packet containing the Universal Access Command, the Random Key Number, and any other relevant user-unique network credentials for each third party database 28 containing the user's medical records and health news updates. The BIA 16 decrypts this package and forwards the data to the kiosk for display to the user. The displayed "Medical" icon represents the URLs of the respective third-parties' Execution Platforms 38 and databases at which resides the user's customized medical information. The kiosk forwards a Random Key Number to each of said URLs, and the respective Execution Platforms 38 query the DPC 10 to authenticate the validity of each of the Random Key Numbers. For each Random Key Number validation provided by the DPC 10 to the respective URL, the user is enabled to access the respective third party database for presentation of the user's private medical data.

Additionally, in this embodiment, the user clicks on the "Reading" icon to access third-party databases 28 storing certain electronic books for which the user has pre-paid, some of which are a customized selection of books related to the user's coursework and some of which are a customized selection of new best sellers. Preferably, while the user was logged-off, these customized book selections were automatically and periodically collected from third-party databases 28 by the Clearinghouse 14 based on the user's Rule-Module 50 to reflect the user's interests. In this instance, the DPC 10 provides the BIA 16 with a packet containing the Universal Access Command, the Random Key Number, and any other relevant user-unique network credentials for each third party database containing the electronic books for which the user has pre-paid. The BIA 16 decrypts this package and forwards the data to the kiosk for display to the user. The displayed "Reading" icon represents the URLs of the respective third-parties' Execution Platforms 38 and databases at which resides the user's customized selection of books. The kiosk forwards a Random Key Number to each of said URLs, and the respective Execution Platforms 38 query the DPC 10 to authenticate the validity of each of the Random Key Numbers. For each Random Key Number validation provided by the DPC 10 to the respective URL, the user is enabled to access the respective third party database for presentation of the user's electronic books' content. In this embodiment, the user downloads the electronic books to a hand-held display panel, such as the Rocket-eBook™.

In this embodiment, the user also clicks on the "Games" icon to access an interactive Internet game site. However, as this user is actually a subordinated user on their parents' primary user accounts, the user's related Rule-Modules 50 are subordinated to their parents' Internet access filtering Rule-Modules 50 which restrict the user's viewing and use of Internet games when the user is not at home. In this case, the location of the BIA 16 notifies the DPC 10 that the user is attempting Internet game access from a public kiosk away from home, and the DPC 10 automatically responds with notification that user access to Internet games is denied.

Further, the user in this embodiment clicks on the "Word Processing" icon to access and edit a short story he is in the process of writing. In this instance, the BIA 16 is automatically provided by the DPC 10 with a packet containing the Universal Access Command, the Random Key Number, and any other relevant user-unique network credentials for the enterprise or third-party 28 database containing the user's word processing programs and word processing content. The BIA 16 decrypts this package and forwards the data to the kiosk for display to the user. The displayed "Word Processing" icon represents the URL of the enterprise or third-party 28 Execution Platform 38 and database at which resides the user's word processing software and content. The kiosk forwards a Random Key Number to said URL, and the respective Execution Platform 38 queries the DPC 10 to authenticate the validity of the Random Key Number. With the DPC's 10 validation to the URL of the Random Key Number, the user enabled to access the respective third party database for editing of the user's word processing content. It should be noted that for preferred security, this particular Random Key Number would be good for only one on-line session by the user with this enterprise or third-party 28 database.

In this embodiment, the user also clicks on the "Buddy List" icon to access his instant electronic messaging accounts. In this instance, the BIA 16 is automatically provided by the DPC 10 with a packet containing the Universal Access Command, the Random Key Number, and any other relevant user-unique network credentials for each third party database containing the instant electronic messaging accounts to which the user belongs. The BIA 16 decrypts this package and forwards the data to the kiosk for display to the user. The displayed "Buddy List" icon represents the URLs of the respective third-parties' Execution Platforms 38 and databases at which reside the user's instant electronic messaging accounts. The kiosk forwards a Random Key Number to each of said URLs, and the respective Execution Platforms 38 query the DPC 10 to authenticate the validity of each of the Random Key Numbers. For each Random Key Number validation provided by the DPC 10 to the respective URL, the user is enabled to access the respective third party database for instant messaging with any other on-line members of his buddy list. In this embodiment, the user's Rule-Modules 50 governing the sending of instant messages by user instruct that these messages are automatically appended with both his personal visual trademark icon and digital certificate, both of which are stored in the Clearinghouse 14. This provides both user-customized visually graphical and cryptographically secure confirmation to recipients that the instant messages are authentically from the user.

In essence, in this embodiment, a public kiosk without resident user-customized data and without extensive resident software, has been automatically and nearly instantly transformed, via a user's biometric log-on, into a terminal receiving on-line sophisticated computing capabilities that are customized for the user, complete with user-customized electronic communication accessing, processing and presentation. The user has been able to personalize: their own Internet web portal displaying all URLs with which the user has pre-registered for access privileges; topical recommendations for local activities, events and people that reflect their priorities; their Internet web site preferences, or "bookmarks"; and temporary DPC 10 downloading to the BIA 16 for RAM storage of their Internet "cookies", or that set of data that an Internet website server provides to a user each time the user visits the website. In this invention, the Clearinghouse's 14 remote servers save the information the cookie contains about the user, as a text file stored in the Netscape or Explorer system folder, and is able to temporarily download this data to whatever BIA 16 the user is currently logged onto.

In sum, the invention constructs and presents for the user, on any terminal equipped with a BIA 16 that the user is using, a user-customized gateway to a public network 18 containing their desired bookmarks, their personalized search engine and their customized web page directory. This is the user's personal Internet 18 web page "portal" which is a starting point for their electronic communications, including electronic mail, Internet 18 web browsing or "surfing", and the like.

In all of these electronic communications, this invention provides the user the ability, with only a single log-on, to automatically enter all restricted or confidential enterprise or third-party databases 28 throughout a public network 18 to which the user has pre-authorized access privileges.

Once the user time the user has completed their Internet 18 usage of the BIA 16 for this on-line session, all of the data stream from their on-line session, including all new cookies provided by third parties on behalf of the user and all new data on their browsing activity, is batched and forward to the DPC 10 for downloading, storage, along with any updating and revising of the user's Rule-Modules 50 within the Clearinghouse 14. Alternatively, the user's session on-line data stream is monitored in real-time by the DPC 10 for central server downloads and real-time revisions to the user's Rule-Modules 50.

Decryption Platform

In a preferred embodiment, all messages the Data Processing Center 10 receives, with the exception of those not transmitted via a BIA 16, contain a BIA 16 hardware identification code, a sequence number, and a Message Authentication Code (MAC). MACs, also known as cryptographic checksums, are well known in the computer industry, and are used to assure that any changes to the content of the message will be detectable by the entity receiving the communication. The Decryption Platform 22 validates the message's MAC and checks the sequence number for that particular BIA. If the Decryption Platform 22 determines that both the MAC and the sequence number are valid, the Decryption Platform 22 uses the unique secret key for that particular BIA 16 to decrypt the message. For the decryption to function properly, the Decryption Platform 22 must contain a copy of each BIA's 16 DUKPT key table.

If the decryption operation fails, or if the MAC check fails, the message is considered an invalid message. The Decryption Platform 22 logs a warning to the logging facility (LF), terminates processing for the message, and returns an error message to the originating BIA 16.

Before the Decryption Platform 22 replies to a message that includes a response key, it encrypts the response message with that response key. The Decryption Platform 22 also generates a MAC for the response and appends it to the message.

Preferably, error messages are not encrypted although the Decryption Platform 22 does include a MAC for message authentication. Such messages never include confidential information. However, most response messages include a status or response codes that can indicate whether the request succeeded or not. For example, when the Execution Platform 38 declines a communication for a specific reason, it does not return an error message, it returns a normal communication response message with a response code set to "failed".

Gateway Platform (GP)

The Gateway Platform 26 serves as an intermediary between redundant Identicator 12 and redundant Clearinghouse 14 servers, routing electronic communications from servers on overload to servers that have available capacity. The Gateway Platform 26 also periodically queries servers to ensure that are operative and to alert the system administrator is any server is inoperative.

Firewall (FW)

The firewall 40 provides a first line of defense against network viruses and computer hackers. All communication links into or out of the Identicator 12 and Clearinghouse 14 server sites first pass through a secure firewall 40 Machine.

Preferably, the firewall 40 Machine, an Internet-localnet router, only handles messages destined for the Gateway Platform 26 machines.

BIA-equipped terminals send packets to Identicator 12 and Clearinghouse 14 server sites via modem, X.25, or other communication medium. The Identicator 12 and Clearinghouse 14 server sites rely on a third-party to supply the modem banks required to handle the volume of calls and feed the data onto the DPC 10 backbone.

For communications between Identicator 12 and Clearinghouse 14 server sites, the FW Machines send out double-length DES encrypted packets. The server site LAN component handles the encryption and decryption: the firewall 40 does not have the ability to decrypt the packets.

A properly configured network sniffer acts as an intruder detector as backup for the FW. If an anomalous message is detected, the intruding messages are recorded in their entirety, an operator is alerted, and the firewall 40 is physically shut down by the sniffer.

The firewall 40 disallows any communications from the internal network to the rest of a public network 18. An electronic communication message requires about 400 bytes and registration packets require about 10 to 20 KB. To handle 1000 electronic communications per second and 1 registration packet per second, the firewall 40 machines are able to process about 400 KB per second.

Execution Platform

In a preferred embodiment, an Execution Command of a Rule-Module 50 causes an electronic communication to be executed by the Execution Platform 38. The Execution Platform 38 can be on a database which is located within the DPC 10 itself, or it can be co-located with a third-party database 28 that is external to the DPC 10. In the event that a designated third-party database 28 cannot be contacted for the electronic communication to be completed, the communication is "declined".

Logging Facility

In a preferred embodiment, the logging facility 42 logs all electronic communication attempts, whether successful or not, to write-once media, so that a record is kept of each communication and each error that has occurred during the operation of the Identicator 12.

From the foregoing, it will be appreciated how the objectives and features of the invention are met.

First, the invention provides a computerized electronic communications system that is tokenless. As such, this system eliminates the need for a user to possess and present any personalized man-made tokens, in order to authorize, send or receive a user-customized electronic communication.

Second, the invention provides a computerized electronic communications system that is capable of verifying a user's unique personal identity, as opposed to verifying the user's possession of personalized objects and information.

Third, the invention provides a cost-effective computerized electronic communications system that is practical, convenient, and easy use.

Fourth, the invention provides a system of secured access to a computer system that is highly resistant to fraudulent electronic communication authorization attempts by unauthorized users.

Fifth, the invention provides a tokenless system for ensuring that users have the portability and mobility to gain immediate access to their electronic communications via any network-connected interface, regardless of the resident capabilities of the computing device the user is using to interface with the computer network and a central server.

Sixth, this invention provides a user-customized "portal" or gateway to the Internet including their desired bookmarks, their personalized search engine and their customized web page directory.

Seventh, this invention provides enhanced security by maintaining authenticating data and carrying out the identity verification operations at a point in the system that is operationally isolated from the user requesting access, thereby preventing the user from acquiring copies of the authenticating data or from tampering with the verification process.

Eighth, this invention enables a user to enter and update their customized data in a centralized database.

Ninth, this invention enables primary users to both register and govern the electronic communications of subordinated users.

Tenth, this invention provides the ability for a third-party database to be identified by the computer system, wherein the user is notified that they have accessed the correct third-party database.

Although the invention has been described with respect to a particular computer system having rule-module clearinghouse and method for its use, it will be appreciated that various modifications of the apparatus and method are possible without departing from the invention, which is defined by the claims set forth below.

What is claimed is:

1. A system for tokenless biometric authorization of an electronic communication, using an electronic communication input apparatus, a biometric input apparatus, and a master electronic identicator, wherein said system comprises:
   a. a communication input apparatus, further comprising a data entry device for formation of an electronic communication;
   b. a biometric input apparatus connected to said communication input apparatus, further comprising a device for electronically scanning a biometric sample directly from a person of a user;
   c. at least one master electronic identicator, further comprising:
      i) a computer database containing all of the electronically stored biometric samples from all of the registered users;
      ii) a comparator that electronically compares a received biometric sample with previously stored biometric samples to deliver either a successful or failed identification of the user;
   d. a data transmittal public network that electronically transmits data between the biometric input apparatus and a master electronic identicator;
   e. an electronic communication authorization platform, connected to said master electronic identifier, that authorizes execution of at least one electronic communication upon a successful identification of the user by an electronic identicator;
   f. a rule-module clearinghouse, connected to said master electronic identifier, further comprising a user-customized rule module including at least one user-customized pattern data associated with at least one user-customized execution command, wherein said execution command comprises instructions for executing the processing of an electronic consumer loyalty or consumer rewards incentive;
   g. a rule-module invocation platform, that invokes at least one previously designated user-customized rule-module upon successful identification of the user;
   h. an electronic communication execution platform, that executes at least one electronic communication upon the invocation of a user-customized rule-module per said execution command;
   wherein an electronic communication is biometrically-authorized in a tokenless manner.

2. The device of claim 1 wherein the master electronic identicator further comprises a computer database which: has a location which is physically remote from the site at which the user submits a biometric sample directly from his person, and; requires the use of a public communication network that enables receipt of an electronically transmitted registration biometric sample.

3. The device of claim 1 further comprising a subset electronic identicator having: a computer database containing a subset of all stored biometric samples from registered users in the computer system, and; a comparator that compares a received biometric sample with previously stored biometric samples to deliver either a successful or failed identification of the user.

4. The device of claim 1 wherein any component of said system is used in any of the following chronological sequences: simultaneously, and; separated by any increment of time including seconds, minutes, hours, days, weeks, months, and years.

5. The device of claim 3, further comprising a data transmittal public network, comprising a public communications network that electronically transmits data between the subset electronic identicator and a master electronic identicator if the comparator of the subset electronic identicator returns a failed identification result.

6. The device of claim 3 further comprising:
   a. an enterprise data input apparatus for an enterprise to electronically input registration identity data;
   b. a data transmittal public network, further comprising a public communications network that electronically transmits data between the enterprise data input apparatus and a master electronic identicator;
   c. an electronic communication authorization platform, that authorizes execution of an electronic communication upon a successful identification of the enterprise by an electronic identicator and a successful identification of the user by an electronic identicator;
   wherein an electronic communication is biometrically-authorized without the user having to present smartcards or magnetic swipe cards.

7. The device of claim 6 wherein any component is used in any of the following chronological sequences: simultaneously, and; separated by any increment of time including seconds, minutes, hours, days, weeks, months, and years.

8. The device of claim 6, further comprising a data transmittal public network, further comprising a public communications network that electronically transmits data between the subset electronic identicator and a master electronic identicator if the comparator of the subset electronic identicator returns a failed identification result.

9. The device of claim 1 wherein the biometric sample taken directly from the person of the user comprises any of the following: a fingerprint, a facial scan, a retinal image, an iris scan, and a voice print.

10. The device of claim 6 wherein the enterprise is a legally formed entity comprising any of the following: a corporation, a foundation, a non-profit organization, a sole proprietorship, a limited liability company, and a partnership.

11. The device of claim 1 wherein the user further provides a personal identification code to the electronic identicator along with a bid biometric sample for purposes of identifying the user.

12. The device of claim 6 further comprising a user re-registration platform, wherein the user's registration biometric sample is compared by at least one electronic identicator to previously registered biometric samples wherein if a match occurs, the electronic identicator is alerted to the fact that the user has attempted to re-register.

13. The device of claim 11 further comprising a biometric theft resolution platform, wherein a user's personal identification code is changed when the user's registered biometric sample is determined to have been fraudulently duplicated.

14. The device of claim 1, wherein an electronic communication comprises any of the following: an email, a telephone call, an encrypted data packet, an Internet telephony, and a facsimile.

15. The device of claim 1, wherein the data transmittal public network further comprises any of the following: an extranet, a wide area network, a cable network, a wireless network, a telephone network, the Internet, an ATM network, or an X.25.

16. The device of claim 6 wherein enterprise registration identity data comprises any of the following: an alpha-numeric code, a hardware identification code, an email address, a financial account, a biometric of an authorized enterprise representative, a non-financial data repository account, a telephone number, a mailing address, a digital certificate, a network credential, an Internet protocol address, a digital signature, an encryption key, and an instant messaging address.

17. The device of claim 1 further comprising a third-party server interconnecting network, wherein the electronic communication execution platform interconnects with one or more third-party servers in order to execute the electronic communication.

18. The device of claim 1 wherein pattern data comprises any of the following: demographic information; an email address; a financial account; internet browsing patterns; a non-financial data repository account; a telephone number; a mailing address; purchasing patterns; database authorization fields; financial credit report data; a call-center queuing, routing and automated response program; an email-center queuing, routing and automated response program; data on pre-paid accounts or memberships for products or services; electronic data utilization patterns; employee status; job title; data on user behavior patterns; a digital certificate; a network credential; an internet protocol address; a digital signature; an encryption key; an instant messaging address; user-customized medical records; an electronic audio signature; and an electronic visual signature.

19. The device of claim 1 wherein said execution commands further comprise user-customized instructions for execution of any of the following: accessing of stored electronic data, processing of electronic data, and presentation of electronic data.

20. The device of claim 19 wherein user-customized accessing of stored electronic data further comprises execution of any of the following: activation of an Internet-connected device; accessing of a secured physical space, and unlocking of a secured physical device.

21. The device of claim 19, wherein user-customized processing of electronic data further comprises invoking any of the following: a digital certificate, an identity scrambler, a database authorization field, an electronic advertisement, an instant messaging program, real-time tracking of an incoming caller or an email sender, a time and attendance monitoring program, an emergency home alarm and personal safety notification program, a real-time challenge-response program, a call-center queuing prioritization program, a call-center routing prioritization program, an email-center queuing prioritization program, an email-center routing prioritization program, an automated caller or emailer response program, a call-forwarding program, and an electronic intelligent software program for electronic data search and retrieval.

22. The device of claim 19 wherein user-customized presentation of electronic data comprises any of the following: a print-out, a computer screen display, an audio message, a tactile sensation and a holographic image.

23. The device of claim 1 wherein the rule-module invocation platform is interconnected with one or more third-party computers.

24. The device of claim 1, wherein user-customized pattern data is provided to the electronic rule-module clearinghouse by any of the following: the user, the electronic identicator, the electronic rule-module clearinghouse, and a user-authorized third party.

25. The device of claim 1, wherein:
the rule-module clearinghouse includes a master rule-module clearinghouse, comprising a computer database storing all of the rule-modules for all of the registered users; and
the device further comprises a subset rule-module clearinghouse, comprising a computer database storing a subset of all of the rule-modules for registered users.

26. The device of claim 1 wherein the data transmittal public network further comprises: a cable network, a wireless cellular network, a wireless digital network, a telephone network, a wide area network, the Internet, an ATM network, and an X.25 connection.

27. The device of claim 1 wherein the master electronic identicator further comprises a computer database having a location which is physically remote from the site at which the user submitted the registration biometric sample.

28. The device of claim 3 wherein the subset electronic identicator further comprises a computer database: being physically remote from the master identicator, and; capable of using any communications network for receiving the bid biometric sample.

29. The device of claim 25 further comprising:
a first rule-module invocation platform, comprising a subset rule-module clearinghouse that invokes at least one user-customized rule-module;
a data transmittal public network, wherein if the subset rule-module clearinghouse fails to invoke a user-customized rule-module, the request is transmitted via a public communications network to a master rule-module clearinghouse;
a second rule-module invocation platform, comprising a master rule-module clearinghouse that invokes at least one user-customized rule-module;
an electronic communication execution platform, that executes at least one electronic communication upon the earliest invocation of a user-customized rule-module by a rule-module clearinghouse.

30. The device of claim 25 wherein the subset rule-module clearinghouse is physically remote from the master rule-module clearinghouse.

31. The device of claim 21 wherein pattern data comprises any of the following: demographic information; an email address; a financial account; internet browsing patterns; a non-financial data repository account; a telephone number; a mailing address; purchasing patterns; database authorization fields; financial credit report data; a call-center queuing, routing and automated response program; an email-center queuing, routing and automated response program; data on pre-paid accounts or memberships for products or services; electronic data utilization patterns; employee status; job title; data on user behavior patterns; a digital certificate; a network credential; an internet protocol address; a digital signature; an encryption key; an instant messaging address; user-customized medical records; an electronic audio signature; and an electronic visual signature.

32. The device of claim 1 wherein:
the system further comprises means for receiving a personal identification code coupled to the biometric input apparatus;

the computer database contains all of the electronically stored biometric samples and associated personal identification codes from all of the registered users; and the comparator electronically compares the received biometric sample with previously stored biometric samples associated with the personal identification code to deliver either a successful or failed identification of the user.

* * * * *